(12) United States Patent
Takao

(10) Patent No.: US 7,153,126 B2
(45) Date of Patent: Dec. 26, 2006

(54) EJECTOR APPARATUS

(75) Inventor: Hiroshi Takao, Nagareyama (JP)

(73) Assignee: Takao Injection Mold Engineering Co., Ltd., Nagareyama (JP)

( * ) Notice: Subject to any disclaimer, the term of this patent is extended or adjusted under 35 U.S.C. 154(b) by 361 days.

(21) Appl. No.: 10/673,590

(22) Filed: Sep. 29, 2003

(65) Prior Publication Data

US 2005/0042322 A1   Feb. 24, 2005

(30) Foreign Application Priority Data

Aug. 18, 2003   (JP) .............................. 2003-294404

(51) Int. Cl.
   *B29C 45/44*   (2006.01)
(52) U.S. Cl. ................ 425/444; 425/556; 425/DIG. 58
(58) Field of Classification Search ................ 425/443, 425/444, 556, DIG. 58
   See application file for complete search history.

(56) References Cited

U.S. PATENT DOCUMENTS

| | | | | |
|---|---|---|---|---|
| 3,905,740 A | * | 9/1975 | Lovejoy | ...................... 425/438 |
| 4,209,160 A | * | 6/1980 | Vanotti | ........................ 249/162 |
| 5,603,968 A | * | 2/1997 | Tajiri et al. | ................. 425/556 |
| 5,814,357 A | * | 9/1998 | Boskovic | ..................... 425/556 |
| 6,039,558 A | * | 3/2000 | Park et al. | ................... 425/556 |
| 6,491,513 B1 | * | 12/2002 | Schneider | .................... 425/577 |
| 6,537,053 B1 | * | 3/2003 | Watkins | ....................... 425/190 |

FOREIGN PATENT DOCUMENTS

| | | |
|---|---|---|
| JP | 07-032370 | 2/1995 |
| JP | 08-052771 | 2/1996 |
| JP | 10-095019 | 4/1998 |

* cited by examiner

*Primary Examiner*—Duane Smith
*Assistant Examiner*—Emmanuel S. Luk
(74) *Attorney, Agent, or Firm*—Burr & Brown

(57) ABSTRACT

An ejector apparatus wherein, in mounting a lift core to a slide base, and in mounting an ejector core to an ejector plate, it is easy to mount the lift and ejector cores to the slide base and the ejector plate, and simultaneously perform adjustment that allows for thermal expansion of the cores. The ejector apparatus includes a lift core extending through a core constituting a mold and movably installed in a longitudinal direction of the lift core with respect to a surface of the core; an ejector plate arranged between the core and a base plate, and being capable of moving up and down, the base plate being arranged below and spaced from the core; and an adjustment coupling constructed such that a lower end portion of the lift core is supported to expand and contract in a longitudinal direction of the lift core relative to the ejector plate.

21 Claims, 17 Drawing Sheets

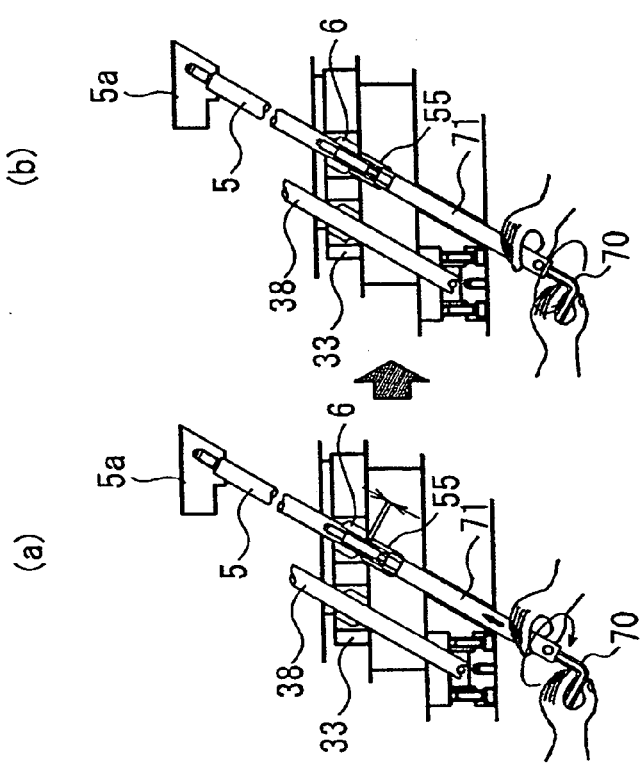

(c)

| Adjusting screw return angle and clearance setting amount | | | |
|---|---|---|---|
| Adjusting screw | Screw thread pitch | 45° | 90° |
| M | 1.0 | 0.13 | 0.25 |
| L | 1.5 | 0.2 | 0.38 |
| LL | 1.5 | 0.2 | 0.38 |
| EL | 2.0 | 0.3 | 0.5 |
| FL | 2.0 | 0.3 | 0.5 |

Calculation example for evaluating thermal expansion of core-rod/bar

Length of core-rod/bar;    600mm

Average temperature rise;    20 to 30°C

Coefficient of linear expansion;    $1.2 \times 10^{-5}$

Thermal expansion;    $600 \times (20 \text{ to } 30) \times 1.2 \times 10^{-5} = 0.14$ to $0.22$ Example of adjustment of thermal expansion of core-rod/bar;

In the case of LLS-LL, from the

| LL | M14 | 1.5 | 0.2 | 0.38 |
|---|---|---|---|---| section of the above table, the return amount and the reversing angle for the adjusting screw are 0.2 and 45°, respectively.

Fig. 11

EJECTOR APPARATUS

This application claims the benefit of Japanese Application 2003-294404, filed Aug. 18, 2003, the entirety of which is incorporated herein by reference.

BACKGROUND OF THE INVENTION

1. Field of the Invention

The present invention relates to an ejector apparatus for moving a lift core which extends through a core constituting a component of a resin molding mold to form an undercut portion in a molded piece and which is installed so as to be capable of moving obliquely with respect to the core surface and in the longitudinal direction.

2. Description of the Related Art

An apparatus for moving a lift core which extends obliquely through a core constituting a component of a resin molding mold to form an undercut portion in a molded piece and which is movable in the longitudinal direction, is called an ejector apparatus, an example of which is disclosed, for example, in JP 10-95019 A.

FIG. 1 schematically shows the construction of the ejector apparatus as disclosed in JP 10-95019 A.

FIG. 1 shows a conventional ejector apparatus 20, which was created by the present inventor. In the apparatus shown, a slide base 33 is arranged in a slide path 32 formed in a vertically movable ejector plate 26, and the slide base 33 is forced to slide as the ejector plate 26 moves up and down, whereby an appropriate axial operating force is imparted to a lift core 28.

FIG. 2 shows the overall configuration of a resin molding mold A equipped with this ejector apparatus 20. The general construction of this mold is as follows: a core 21b is arranged under a mold main body 21a, with the mold main body 21a and the core 21b defining a resin molding space 22 (FIG. 1).

Below the core 21b, there is arranged a base plate 23, and, between the core 21 and the base plate 23, there is arranged a spacer 24 on either side, thus defining a chamber 25 between the spacers 24 under the core 21b. In this chamber 25, the ejector plate 26 is arranged so as to be vertically movable. Note that FIG. 1 is a partial sectional view, taken along the line I—I, of the resin molding mold A shown in FIG. 2.

In this resin molding mold A, there is provided a lift core 28 which is passed through an angle setting hole 27 (inclined by an angle K) of the core 21b constituting the resin molding mold A to form an undercut portion in a molded piece formed in the above-mentioned resin molding space 22 and which extends obliquely and is longitudinally movable.

The upper end portion of this lift core 28 functions as a mold portion 28a which cooperates with the core 21b to form a molded piece, and, by the side of this upper portion, there is formed a protrusion 28b for integrally forming an L-shaped flange portion (which also constitutes a part of the undercut portion) in the molded piece.

This lift core 28 is passed through a guide hole 31a formed obliquely in a guide plate 31 which is fitted into a recess 29 formed in the lower surface of the core 21b and which is fastened to the core 21b by bolts 30, with the lift core 28 extending downwardly from the core 21b.

This guide plate 31, which allows smooth longitudinal sliding of the lift core 28 due to the guide hole 31a formed in the guide plate 31 at a predetermined angle K, functions as a bearing. Since the inclination angle K is determined by the angle setting hole 27 formed in the core 21b, the guide hole 31a may be a loose fit or clearance hole.

This lift core 28 is caused to slide vertically in the angle setting hole 27 of the core 21b by the ejector apparatus 20. The ejector apparatus 20 used for this purpose includes an ejector plate 26 composed of two plates 26a and 26b superimposed one upon the other.

Formed in the lower plate 26b of the ejector plate 26 is the slide path 32, which extends in the direction in which the lower end of the lift core 28 makes relative horizontal movement when it ascends and descends. The slide base 33 is slidably arranged in this slide path 32, and the lower end portion 28d of the lift core 28 is retained by one end portion of the slide base 33 with respect to the sliding direction of the lift core 28.

Further, the ejector apparatus 20, which raises and lowers the lift core, is equipped with an angular guide rod (hereinafter simply referred to as the guide rod) 38 which is adjacent to the lift core 28 and which is parallel thereto. At either end of this guide rod 38, there is formed a V-shaped cutout 39. The upper end portion of the guide rod 38 is supported by engaging one cutout 39 thereof with a pin 40 mounted across a through hole 31b formed in the guide plate 31.

Incidentally, FIG. 3 is an overall view of the slide base 33 slidably provided in the ejector plate 26. This slide base 33 includes a base main body 34 having at its ends with respect to the sliding direction thereof forked portions 34a and 34b that are U-shaped in plan view. In one forked portion 34a of this base main body 34, there is arranged a shaft coupling 35, and, in the other forked portion 34b, there is arranged a guide bush 36.

The shaft coupling 35 arranged in the forked portion 34a is rotatably mounted to opposed wall surfaces by means of pins or the like. FIG. 4 is an enlarged view of the forked portion 34a of the base main body 34 where the shaft coupling 35 is mounted.

As is apparent from FIGS. 1 through 4, formed at the upper end of the shaft coupling 35 is a recess or seat 35a for receiving the lower end portion of the lift core 28. Further, the shaft coupling 35 is equipped with a through-hole 35b having a central axis perpendicular to the rotation axis of the shaft coupling 35 and matched with the center line of the recess 35a mentioned above.

The lower end portion of the lift core 28 is fitted into the recess 35a at the upper end of the shaft coupling 35 rotatably mounted to one forked portion 34a of the base main body 34, and the end portion of a bolt 37 inserted into the through-hole 35b from the lower end of the shaft coupling 35 as shown in FIG. 1 is threadedly engaged with a tapped hole formed in the lower end surface of the lift core 28, whereby the lower end portion of the lift core 28 is firmly secured to the coupling 35.

The guide bush 36 mounted to the other forked portion 34b of the base main body 34 has a passing hole 36a extending along an axis perpendicular to the rotation axis of the guide bush 36, and the above-mentioned guide rod 38 is slidably passed through this passing hole 36a.

The guide rod 38, which is supported at its upper end by the guide plate 31 and which is passed through the passing hole 36a of the guide bush 36 of the slide base 33, extends toward the base plate 23 through a clearance hole 41 formed in the lower plate 26b, and the cutout 39 at its lower end is engaged with a pin 43 of a holder bush 42 mounted to the base plate 23, whereby the lower end of the guide rod is supported and secured.

This holder bush 42 is inserted into an opening 44 formed in the base plate 23 and is secured in position by bolts 45. As described above, the guide rod 38 is arranged so as to be parallel to the lift core 28, that is, inclined by the same angle as the lift core 28. As is apparent from FIG. 1, the distance between the core 21b and the base plate 23 (that is, the height of the spacers 24) is fixed, so that the setting of the angle of the guide rod 38 depends upon the horizontal positional relationship, that is, the distance, between the pin 40 provided in the guide plate 31 and the pin 43 provided in the holder bush 42.

In this conventional ejector apparatus 20, when the ejector plate 26 ascends, the slide base 33 arranged in the slide path 32 formed in the ejector plate 26 also ascends, and a vertical moving force is imparted to the lift core 28, whose lower end is connected to the slide base 33.

In this process, as a result of its ascent, the slide base 33 receives a horizontal component of a moving force biasing it to move along the guide rod 38, which is mounted at the same inclination angle as the lift core 28. As a result, a moving force to push up the lift core 28 in the longitudinal and axial directions is imparted to the lift core 28. Descent of the ejector plate 26 results in an operation contrary to the above, and the lift core 28 is pulled down in the longitudinal direction thereof through the slide base 33.

Incidentally, the inclination angle K (See FIG. 5A) of the lift core 28 in this ejector apparatus is changeable to an arbitrary angle according to the molded piece 22 to be obtained, and the inclination angle K of this lift core 28 is determined by the user who is going to produce the molded piece 22 by using this ejector apparatus 20 Thus, as for the longitudinal length of the lift core 28, additional setting is required on the part of the user who has purchased the ejector apparatus 20.

In view of this, in the conventional ejector apparatus, when fixing the lower end portion 28d of the lift core 28 to the slide base 33, (1) the lift core 28, prepared in a relatively large length, is temporarily incorporated, and (2) the amount á by which the protrusion 28b of the lift core 28 protrudes on the molded piece side (See FIG. 5B) is measured, determining the corrected set value of the rod length of the lift core 28 from this measurement value á. And, the lift core 28 has to be pulled out for additional machining to adjust the rod length thereof before incorporating it again.

Further, in the operation of assembling the ejector apparatus, when effecting threaded engagement of the slide base 33 through the lower end surface of the lift core 28 and the shaft coupling 35, the base plate 23 is removed as shown in FIG. 1 or a hexagonal wrench hole is formed in the base plate 23, thus making the lift core 28 detachable. Further, since the lift core 28 is vertically movable, and the slide base 33 is horizontally slidable, the assembly operation is rather difficult to perform. Furthermore, in addition to the corrected core rod length set value determined, it is necessary, depending upon the assembly system, to take into consideration the thermal expansion amount due to the temperature rise during molding operation of the rod of the lift core 28. In this way, the additional setting of the lift core 28 in the longitudinal direction by the user is not only a bother but also involves extreme difficulty in achieving a predetermined machining accuracy.

The following problems are to be taken into account: (1) when the additional setting of the lift core lower end surface results in an excessive length, the lift core 28 sticks out on the resin molded piece side, resulting in fluctuation due to molding pressure and a damaged product appearance; and (2) when the additional setting results in too small a length, the ejector plate 26 is raised together with the slide base 33 connected to the lift core 28, and due to displacement of all the components installed in this plate, the design consistency suffers, or the mounting screw 37 may be broken.

That is, in setting the length of the lift core, problems are involved whether the lift core is too long or too short, and, to determine the setting range, a very severe and difficult operation, which is contingent on the limited clearance between the slide base 33 and the slide path 32, has to be performed while taking into account the thermal expansion of the lift core 28.

Thus, there is a demand for an improvement in terms of the operational efficiency in assembling these components, i.e., the slide base 33 and the lift core 28.

SUMMARY OF THE INVENTION

The present invention has been made with a view toward solving the above problems in the prior art. It is an object of the present invention to provide an ejector apparatus for use in a resin molding mold, in which, in mounting the lift core, which is to be installed in an inclined state, to the slide base, there is no need for the user to perform any machining operation, making it possible to easily mount the lift core to the slide base regardless of the inclination angle of the lift core.

The present invention relates to an ejector apparatus and has the following structures in order to solve the above-described technical objects.

That is, according to the present invention, there is provided an ejector apparatus for forming an undercut portion in a molded piece, characterized by including: a lift core extending through a core that constitutes a resin molding mold and installed so as to be movable in a longitudinal direction of the lift core with respect to a surface of the core; an ejector plate arranged between the core and a base plate so as to be capable of moving up and down, the base plate being arranged below the core while being spaced apart from the core; and an adjustment coupling constructed such that a lower end portion of the lift core is supported so as to be capable of expanding and contracting in a longitudinal direction of the lift core with respect to the ejector plate.

In this construction, the assembly setting for the rod of the lift core manufactured based on the design value can be effected after assembly within the adjustment range for the adjustment coupling without performing any machining to diminish its length. Further, it is possible to absorb the thermal expansion of the rod of the lift core.

Also, in the ejector apparatus according to the present invention, the adjustment coupling is provided on an ejector plate side and is equipped with: a support member which has an insertion hole allowing insertion of the lower end portion of the lift core, the insertion hole having a threaded portion, the lower end portion of the lift core inserted from one end of the insertion hole being supported on the ejector plate side; an adjusting screw formed as a hollow cylinder having a threaded portion on its outer peripheral surface and adapted to be threadedly inserted from the other end of the insertion hole of the support member to abut the lower end portion of the lift core; a lock nut serving as a locking means; and a bolt member for fastening together the adjusting screw and the lower end portion of the lift core.

In this construction, the setting of the thermal expansion amount can be effected based on the reversing amount of the adjusting screw.

Further, according to the present invention, there is provided an ejector apparatus for forming an undercut portion in a molded piece, characterized by including: a lift core extending through a core constituting a resin molding mold, the lift core being installed so as to be movable obliquely with respect to a surface of the core and in a longitudinal direction of the lift core; an ejector plate arranged between the core and a base plate so as to be capable of moving up and down, the base plate being arranged below the core while being spaced apart from the core; a slide path formed in the ejector plate so as to extend in a direction in which a lower end of the lift core makes relative horizontal movement at a time of ascent and descent of the lift core; a slide base movably arranged in the slide path; a guide bush supported on the slide base so as to be pivotable in an inclining direction of the lift core; and a guide rod that serves to force the slide base to slide horizontally by sliding along the guide bush at a time of ascent and descent of the ejector plate, the ejector apparatus being characterized in that the slide base is equipped with: a slide base main body; and an adjustment coupling constructed such that a lower end portion of the lift core is supported so as to be capable of expanding and contracting in a longitudinal direction of the lift core with respect to the sliding base main body.

In this construction, the assembly setting for the rod of the lift core manufactured based on the design value can be effected after assembly within the adjustment range for the adjustment coupling without performing any machining to diminish its length. Further, no sliding of the slide base due to the guide rod (release guide) occurs, thus facilitating the assembly.

Further, in the ejector apparatus according to the present invention, the adjustment coupling is constructed such that the lower end portion of the lift core is supported so as to be pivotable in an inclining direction of the lift core with respect to the sliding base main body in such a way that an inclination angle of the guide rod is the same as an inclination angle of the lift core.

In this construction, the base main body is equipped with the guide bush pivotable in the inclining direction of the lift core and the adjustment coupling pivotable in the inclining direction, whereby it is possible to forcibly move the ejector plate up and down and forcibly move the slide base in the horizontal direction while maintaining the same inclination angle for the axes of the guide rod and the lift core (i.e., keeping them parallel to each other). That is, the slide base simultaneously receives a horizontal moving force and an upward or downward moving force, and a force which would cause rotation in the slide path is exerted. However, in the present invention, as long as the slide base has been assembled so as to be parallel to the longitudinal direction of the slide path, even if a force that would cause the slide base to rotate within the slide path is exerted, it is possible to keep the slide base parallel to the slide path. Thus, the slide base can always remain parallel to the slide surface of the slide path. As a result, in the present invention, it is possible to completely avoid, with a simple structure, hindrance to sliding, without performing any additional machining on the lift core and the slide base, thus realizing smooth sliding movement.

Further, according to the present invention, there is provided an ejector apparatus for forming an undercut portion in a molded piece, characterized by including: a lift core extending through a core constituting a resin molding mold, the lift core being installed so as to be movable obliquely with respect to a surface of the core and in a longitudinal direction of the lift core; an ejector plate arranged between the core and a base plate so as to be capable of moving up and down, the base plate being arranged below the core while being spaced apart from the core; a slide path formed in the ejector plate so as to extend in a direction in which a lower end of the lift core makes relative horizontal movement at the time of ascent and descent of the lift core; a slide base movably arranged in the slide path; an adjustment coupling constructed such that a lower end portion of the lift core is supported so as to be capable of expanding and contracting in a longitudinal direction of the lift core and rotatable in an inclining direction of the lift core with respect to the sliding base main body; a guide bush supported on the slide base so as to be pivotable in an inclining direction of the lift core; and a guide rod that serves to force the slide base to slide horizontally by sliding along the guide bush at the time of ascent and descent of the ejector plate, the being characterized in that the adjustment coupling is endowed with an alignment function by which an intersection point where the guide rod and the core cross each other, an intersection point where the guide rod and the guide bush cross each other, an intersection point where the lift core and the core cross each other, and an intersection point where the lift core and the adjustment coupling cross each other, are capable of forming a parallelogram.

In this construction, it is possible to forcibly move the ejector plate up and down and forcibly move the slide base in the horizontal direction while maintaining the same inclination angle for the intersection points for the guide rod and the lift core (i.e., keeping them parallel to each other). That is, even if the slide base simultaneously receives a horizontal moving force and an upward or downward moving force, it is possible to keep the slide base parallel to the slide path due to the alignment function by which the four intersection points are capable of forming a parallelogram.

Further, in the above-mentioned ejector apparatus according to the present invention, the adjustment coupling is provided on a slide base side, and is equipped with: a support member which has an insertion hole allowing insertion of the lower end portion of the lift core, the insertion hole having a threaded portion, the lower end portion of the lift core inserted from one end of the insertion hole being supported on the slide base; an adjusting screw formed as a hollow cylinder having a threaded portion on its outer peripheral surface and adapted to be threadedly inserted from the other end of the insertion hole of the support member to abut the lower end portion of the lift core; a lock nut serving as a locking means; and a bolt member for fastening together the adjusting screw and the lower end portion of the lift core.

In this construction, the setting of the thermal expansion amount can be effected based on the reversing amount of the adjusting screw.

Further, according to the present invention, there is provided an ejector apparatus, characterized in that the adjusting screw and/or the lock nut has an inner hexagonal wrench hole.

In this construction, a minimum hole allows insertion of the hexagonal wrench and provides rotation space, thus allowing space saving in terms of the area occupied inside the ejector apparatus itself. Further, a minimum hole allows insertion of a hollow wrench (hexagonal sleeve wrench) and provides rotation space, thus making it possible to achieve a reduction in the size of the ejector apparatus itself.

Further, the hexagonal wrench, which always undergoes integral threaded insertion in assembling the adjusting screw, is inserted into the hollow of the hollow wrench, thus allowing assembly of two coaxial components (i.e., the adjusting screw and the lock nut). Further, a hexagonal wrench is inserted into the hollow wrench (the hexagonal sleeve wrench), which undergoes integral threaded insertion in assembling the lock nut, thus allowing assembly of two coaxial components.

Further, according to the present invention, there is provided an ejector apparatus characterized in that respective screws of the adjusting screw and the lock nut exhibit a screw fit length allowing locking without involving any stress relaxation due to fastening pre-tension.

Further, according to the present invention, there is provided an ejector apparatus characterized in that the adjusting screw and the lock nut each have a hexagonal wrench hole structure for a hollow hexagonal wrench with a round hole for fastening the lock nut and for a hexagonal wrench to be inserted into a hollow of the hollow hexagonal wrench with a round hole to fasten the adjusting screw, and that the base plate and the ejector plate each have a space portion in which the hexagonal wrenches are turned around an axis of the hexagonal wrench hole structure.

Further, according to the present invention, there is provided an ejector characterized in that the adjustment coupling is equipped with a clearance setting portion that serves to set a predetermined clearance in an axial length of the lift core through reversal of the adjusting screw by an amount corresponding to an angle that can be known from the pitch of the screw portion after abutting the adjusting screw against the lower end portion of the lift core.

As described above, in the ejector apparatus for a resin molding mold of the present invention, the rod of the lift core prepared based on the design value allows assembly setting within the adjusting range for the adjustment coupling after the assembly, without having to perform any machining to diminish the length thereof. Further, it is possible to absorb the thermal expansion of the rod of the lift core.

BRIEF DESCRIPTION OF THE DRAWINGS

In the accompanying drawings:

FIGS. 6A and 6B are explanatory views illustrating the assembling of the lift core of an ejector apparatus, of which FIG. 6A shows a slide base when a shaft coupling is used, and FIG. 6B shows a slide base when no shaft coupling is used;

FIGS. 11A through 11C are diagrams illustrating assembly procedures for an adjustment coupling;

DESCRIPTION OF THE PREFERRED EMBODIMENTS

Embodiments of an ejector apparatus for a resin molding mold of the present invention will now be described in detail.

FIRST EMBODIMENT

Figure 7:
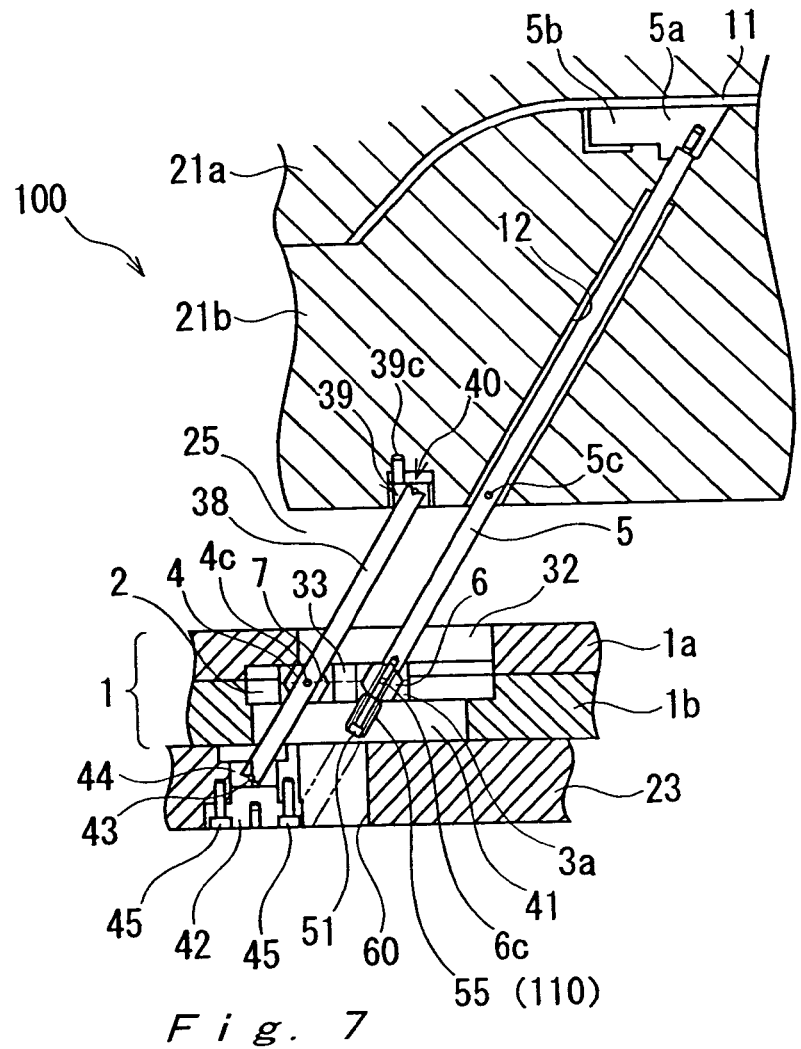
FIG. 7 is a sectional view of an ejector apparatus for a resin molding mold according to a first embodiment of the present invention.

FIG. 7 shows an ejector apparatus 100 for a resin molding mold according to a first embodiment of the present invention.

Figure 2:
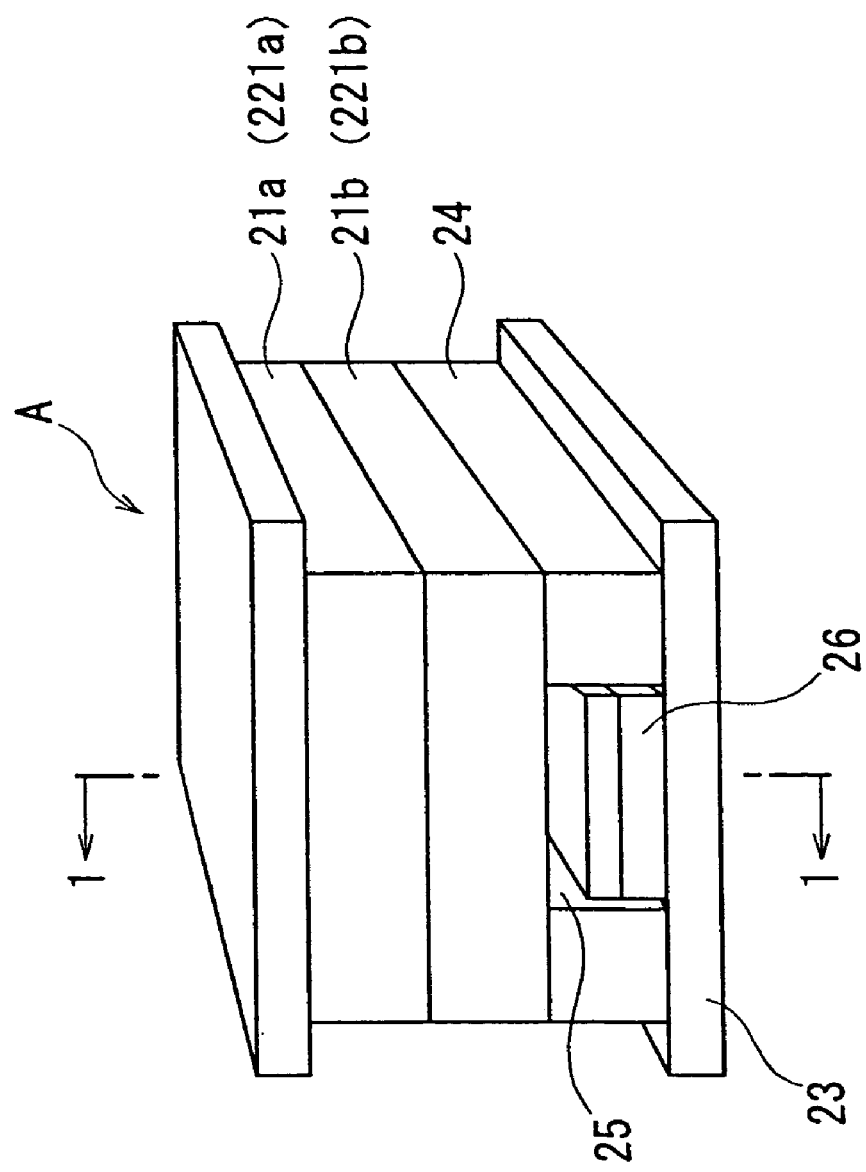
FIG. 2 is an overall perspective view of a resin molding mold equipped with the ejector apparatus as shown in FIG. 1.
Figure 3:
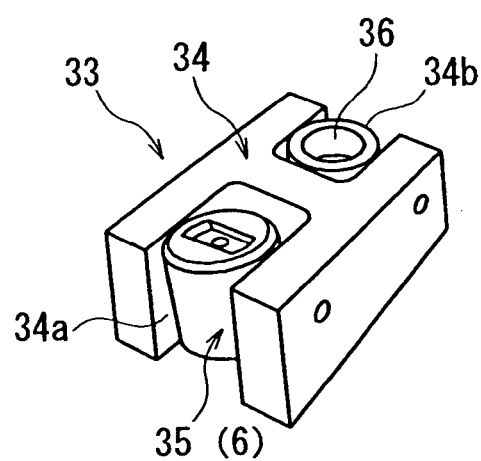
FIG. 3 is an overall perspective view of a slide base constituting the ejector apparatus shown in FIG. 1.
Figure 4:
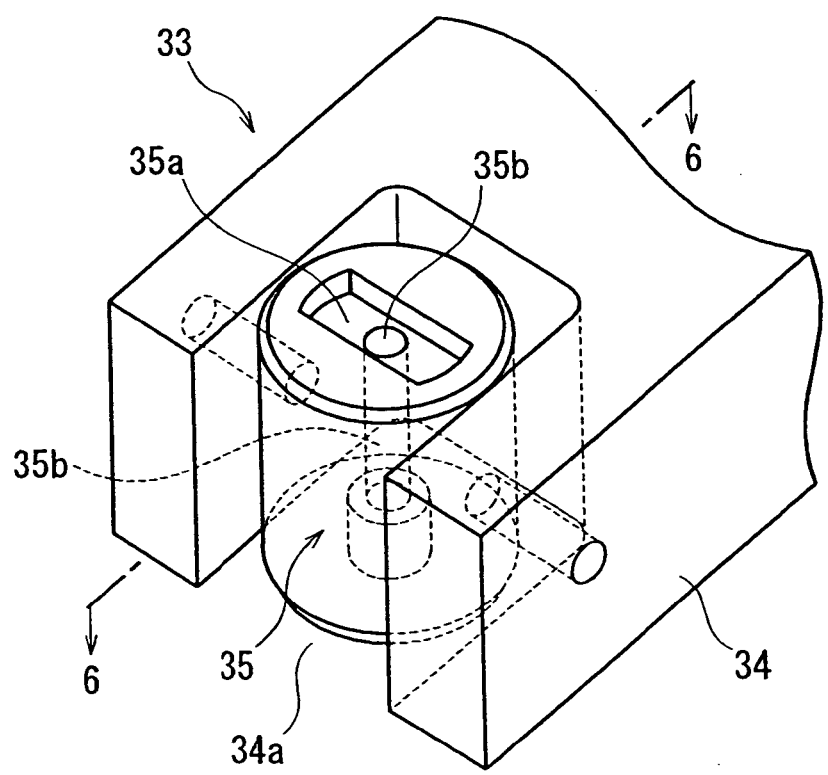
FIG. 4 is an enlarged perspective view of one forked portion of a slide base main body constituting the slide base shown in FIG. 3, in which a shaft coupling is mounted.
Figure 5:
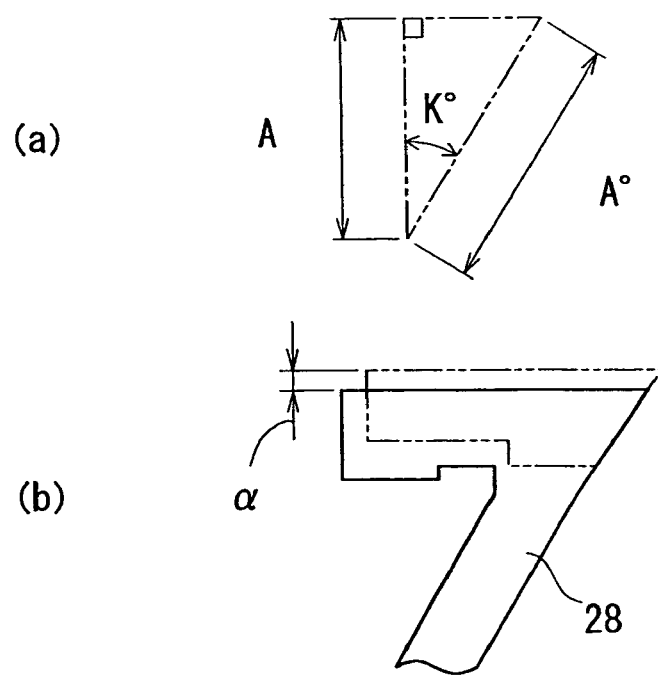
FIGS. 5A and 5B are explanatory views illustrating the assembling of a lift core of an ejector apparatus.
Figure 6:
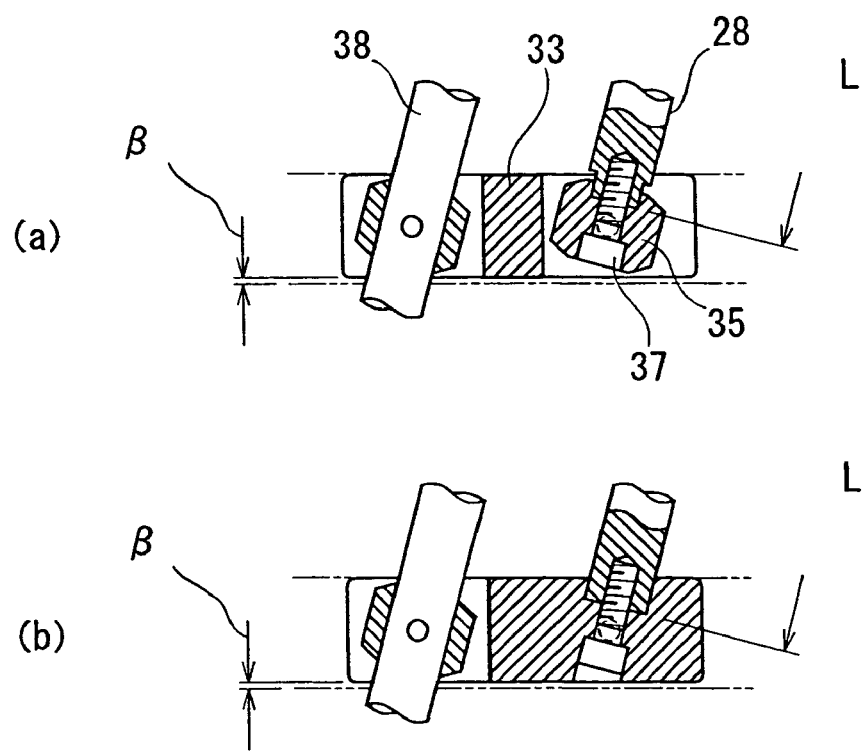

First, a resin molding mold A equipped with this ejector apparatus 100 will be described. As shown in FIG. 2, the general construction of this mold is as follows: a core 21b is arranged under a mold main body 21a, with the mold main body 21a and the core 21b defining a resin molding space 11 (FIG. 7).

Below the core 21b, there is arranged a base plate 23, and, between the core 21b and the base plate 23, there is arranged a spacer 24 on either side, thus defining a chamber 25 between the spacers 24 under the core 21b. In this chamber 25, an ejector plate 1 is arranged so as to be vertically movable. Note that FIG. 7 is a partial sectional view, taken along the line I—I, of the resin molding mold A shown in FIG. 2.

In this resin molding mold A, there is provided a lift core 5 which is passed through an angle setting hole 12 (inclined by an angle K) of the core 21b constituting the resin molding mold A to form an undercut portion in a molded piece formed in the above-mentioned resin molding space 11 and which extends obliquely and is longitudinally movable.

The upper end portion of this lift core 5 functions as a mold portion 5a which cooperates with the core 21b to form a molded piece, and, by the side of this upper portion, there is formed a protrusion 5b for integrally forming an L-shaped flange portion (which also constitutes a part of the undercut portion) in the molded piece. This lift core 5 is passed through a guide hole formed obliquely in the core 21b, extending downwardly from the core 21b.

This lift core 5 is caused to slide vertically in the angle setting hole 12 of the core 21b by the ejector apparatus 100. The ejector apparatus 100 used for this purpose includes the ejector plate 1 composed of two plates 1a and 1b that are superimposed one upon the other.

Formed in the lower plate 1b of the ejector plate 1 is a slide path 32, which extends in the direction in which the lower end of the lift core 5 makes relative horizontal movement when it ascends and descends. A slide base 33 is slidably arranged in this slide path 32, and the lower end portion 5d of the lift core 5 is retained by one end portion of the slide base 33 with respect to the sliding direction thereof.

Further, the ejector apparatus 100, which raises and lowers the lift core 5, is equipped with an angular guide rod (hereinafter simply referred to as the guide rod) 8 which is adjacent to the lift core 5 and which is parallel thereto. At either end of this guide rod 8, there is formed a V-shaped cutout 39. The upper end portion of the guide rod 8 is supported by engaging one cutout 39 thereof with a pin 40.

Figure 14:
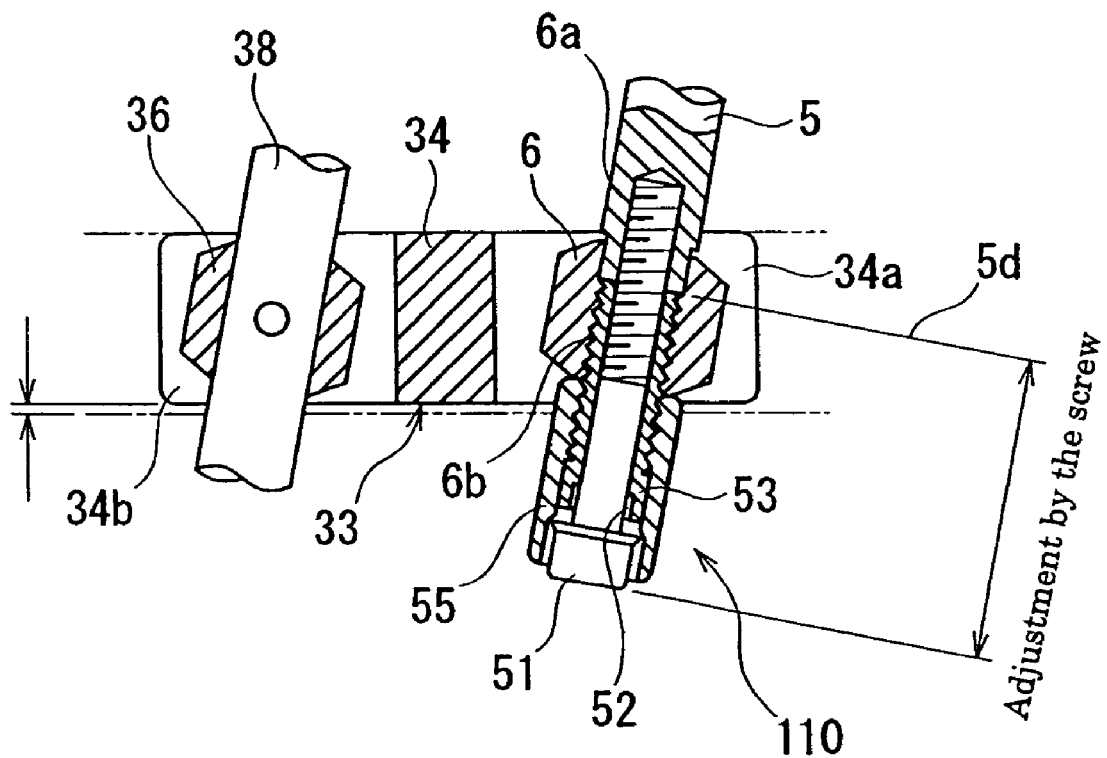
FIG. 14 is a longitudinal sectional view of a slide base and an adjustment coupling.

Incidentally, FIG. 14 is an overall view of the slide base 33 slidably provided in the above-mentioned ejector plate 1.

[Slide Base 33]

This slide base 33 includes a base main body 34 having at its ends with respect to the sliding direction of the slide base 33 forked portions 34a and 34b that are U-shaped in plan view. In one forked portion 34a of this base main body 34, there is arranged a shaft coupling 36, and in the other forked portion 34b, there is arranged a guide bush 36.

The lower end portion 5d of the lift core 5 is supported by an adjustment coupling 110 so as to be extendable in the longitudinal direction and rotatable in the inclining direction with respect to the base main body 34.

[Guide Rod 38]

Further, the guide bush 36 rotatably mounted to the other forked portion 34b of the base main body 34 has a passing hole 36a extending along an axis perpendicular to the rotation axis of the guide bush 36, and the above-mentioned guide rod 38 is slidably passed through this passing hole 36a.

The guide rod 38, which is supported at its upper end by a guide holder 39 and which is passed through the passing hole 36a of the guide bush 36 of the slide base 33, extends toward the base plate 23 through a clearance hole 41 formed in the lower plate 26b, and the cutout 39 at its lower end is engaged with a pin 43 of a holder bush 42 mounted to the base plate 23, whereby the lower end of the guide rod is supported and secured.

This holder bush 42 is inserted into an opening 44 formed in the base plate 23 and is secured in position by bolts 45. As described above, the guide rod 38 is arranged so as to be parallel to the lift core 5, that is, inclined by the same angle as the lift core 5. As is apparent from FIG. 7, the distance between the core 21b and the base plate 23 (that is, the height of the spacers 24 (See FIG. 2)) is fixed, so that the setting of the angle of the guide rod 38 depends upon the horizontal positional relationship, that is, the distance, between the pin 40 provided in the guide holder 39 and the pin 43 provided in the holder bush 42. In FIG. 7, the intersection points (axial center points) 39c and 4c of the guide rod 38 and the intersection points (axial center points) 5c and 6c of the lift core 5 form a parallelogram.

By thus forming a parallelogram, it is possible to force the ejector plate 1 to move vertically and to force the slide base 33 to move horizontally, with the axial center points 39c, 4c, 5c, and 6c of the guide rod 38 and the lift core 5 maintaining the same inclination angle (that is, keeping these components parallel to each other). That is, even when the slide base 33 simultaneously receive horizontal and vertical moving forces and a force to rotate the slide base 33 within the slide path 32 is exerted, the slide base 33 can be kept parallel to the slide path due to the self-alignment function which enables the four axial center points to form a parallelogram.

[Adjustment Coupling 110]

Next, the adjustment coupling 110 will be described with reference to FIGS. 7, 8, and 14.

The adjustment coupling 110 is composed of the shaft coupling 6 which is a support member supporting the lower end portion 5d of the lift core 5 on the base main body 34 and rotatable in the inclining direction, an adjusting screw 53 abutting the lower end portion 5d of the lift core 5, a bolt member (also referred to as cap bolt) 51 and a washer (spacer collar) 52 for fastening the adjusting screw 53 and the lower end portion 5d of the lift core 5 to each other, and a lock nut 55 to be threadedly engaged with the outer peripheral surface of the adjusting screw 53 until it abuts the other end portion of the shaft coupling 6.

The shaft coupling 6 arranged in the forked portion 34a is rotatably mounted to opposing wall surfaces by means of pins or the like. Further, the shaft coupling 6 is equipped with a through-hole 6b in alignment with the center axis thereof which is perpendicular to the rotation axis thereof. A threaded portion is formed in the inner peripheral surface of the through-hole 6b.

Figure 8:
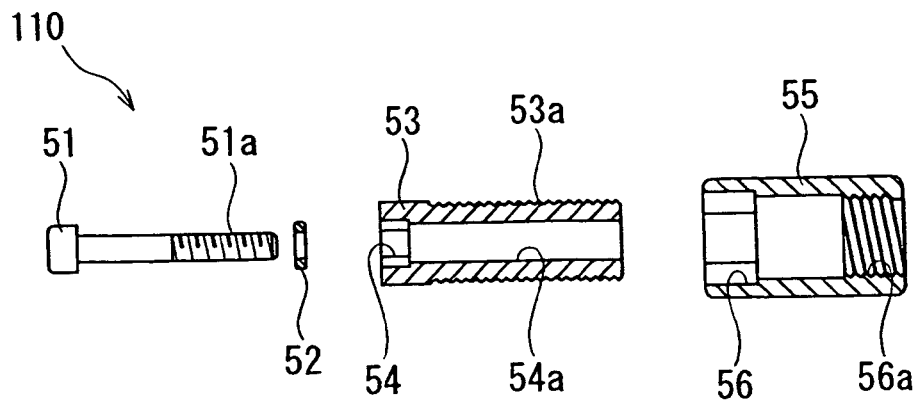
FIG. 8 is a longitudinal sectional view of an adjustment coupling.
Figure 9:
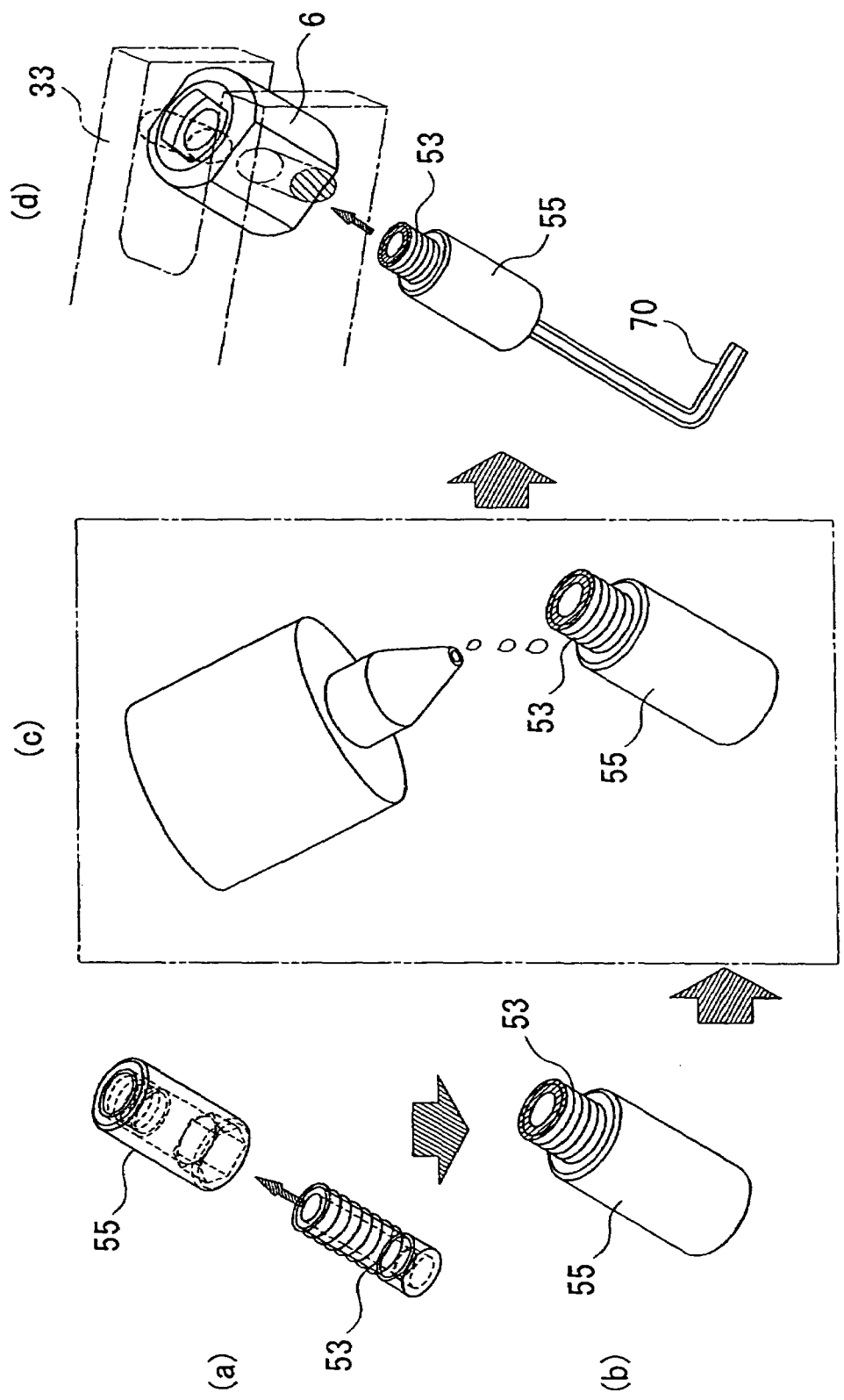
FIGS. 9A through 9D are diagrams illustrating assembly procedures for an adjustment coupling.
Figure 10:
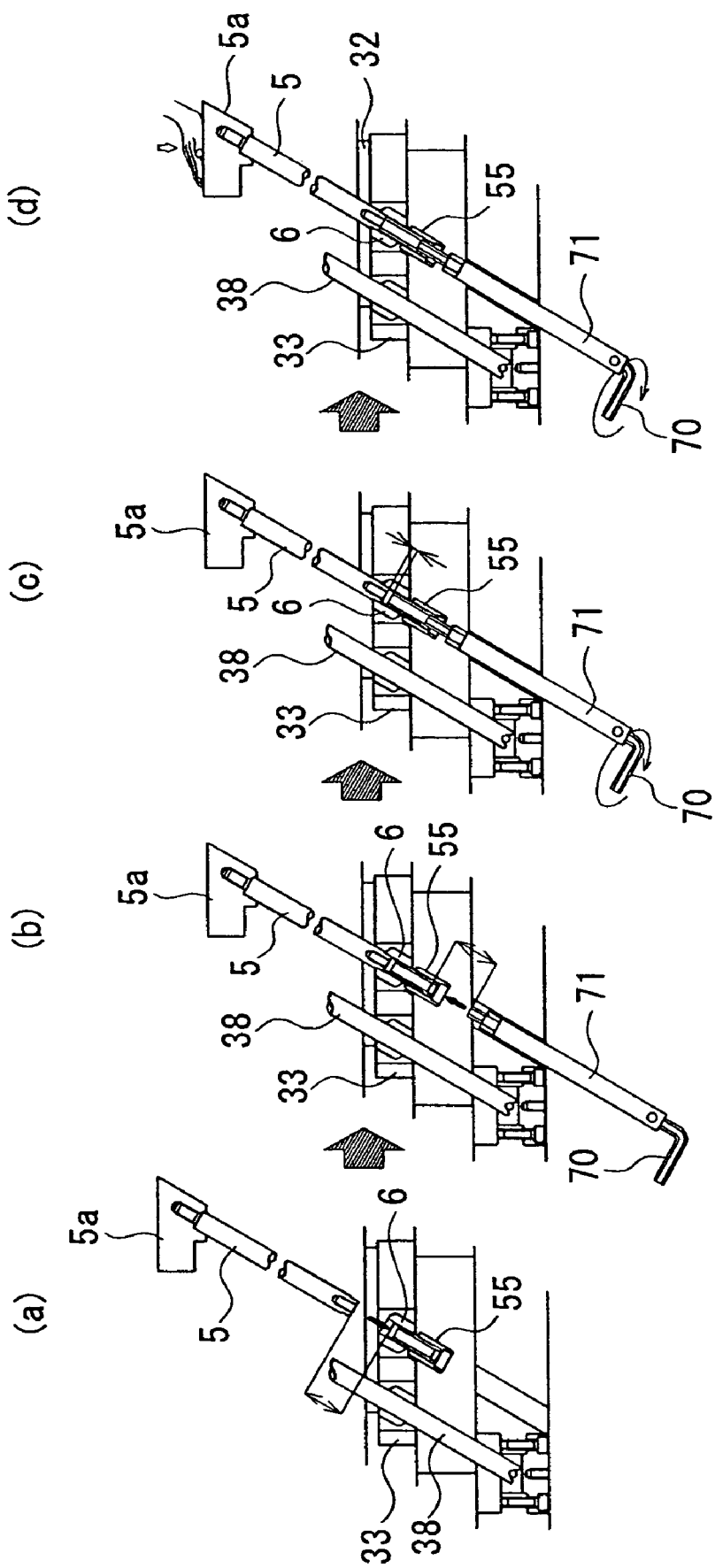
FIGS. 10A through 10D are diagrams illustrating assembly procedures for an adjustment coupling.
Figure 12:
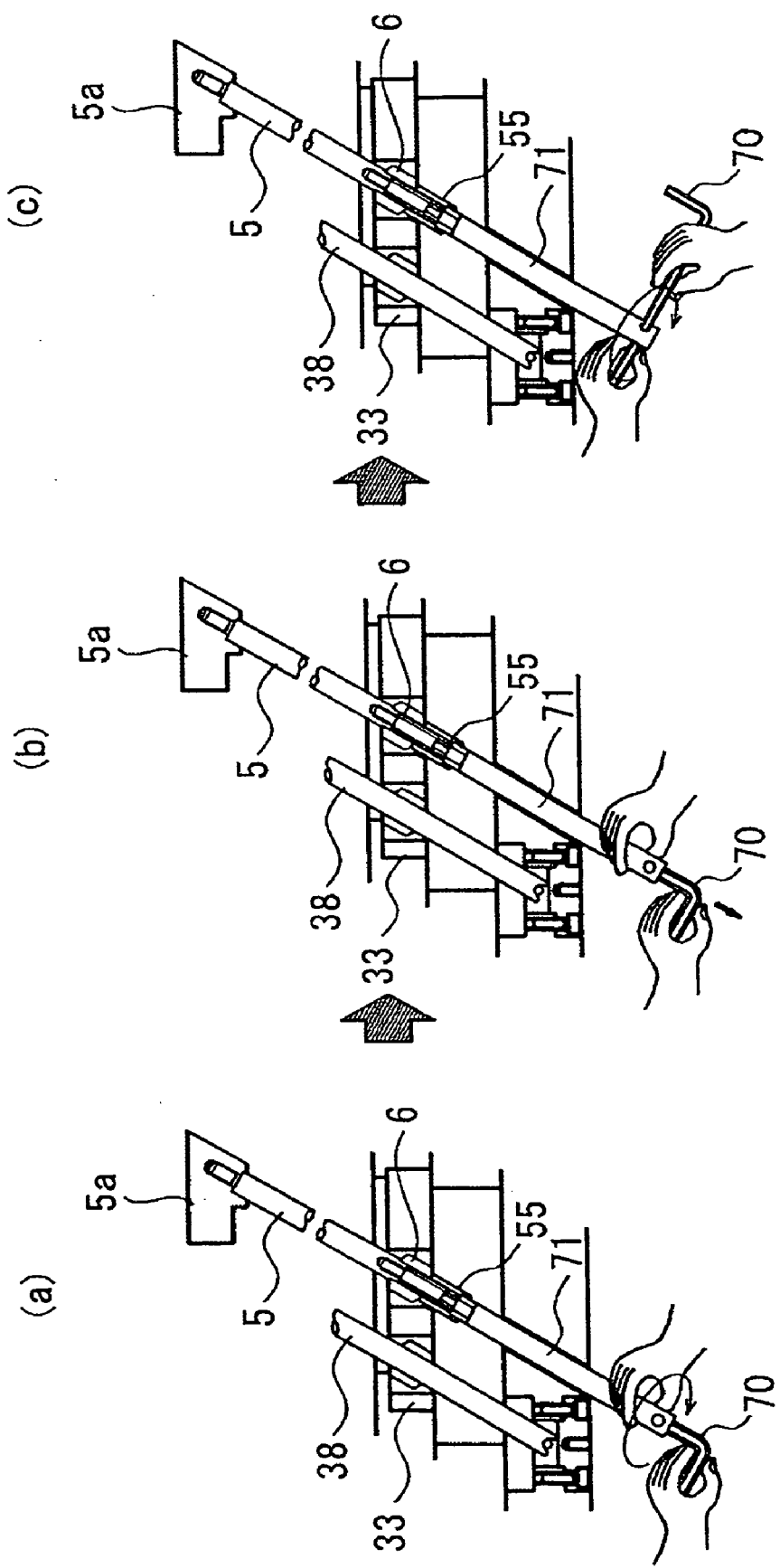
FIGS. 12A through 12c are diagrams illustrating assembly procedures for an adjustment coupling.

As shown in FIG. 8, the adjusting screw 53 is formed as a hollow cylinder having a threaded portion 53a on its outer peripheral surface. Further, the adjusting screw 53, which is formed as a hollow cylinder, has an inner hexagonal wrench hole 54 in the inner peripheral surface at one end thereof. The adjusting screw 53 is threadedly passed through the through-hole 6b of the shaft coupling 6 and abuts the lower end portion 5d of the lift core 5.

Figure 13:
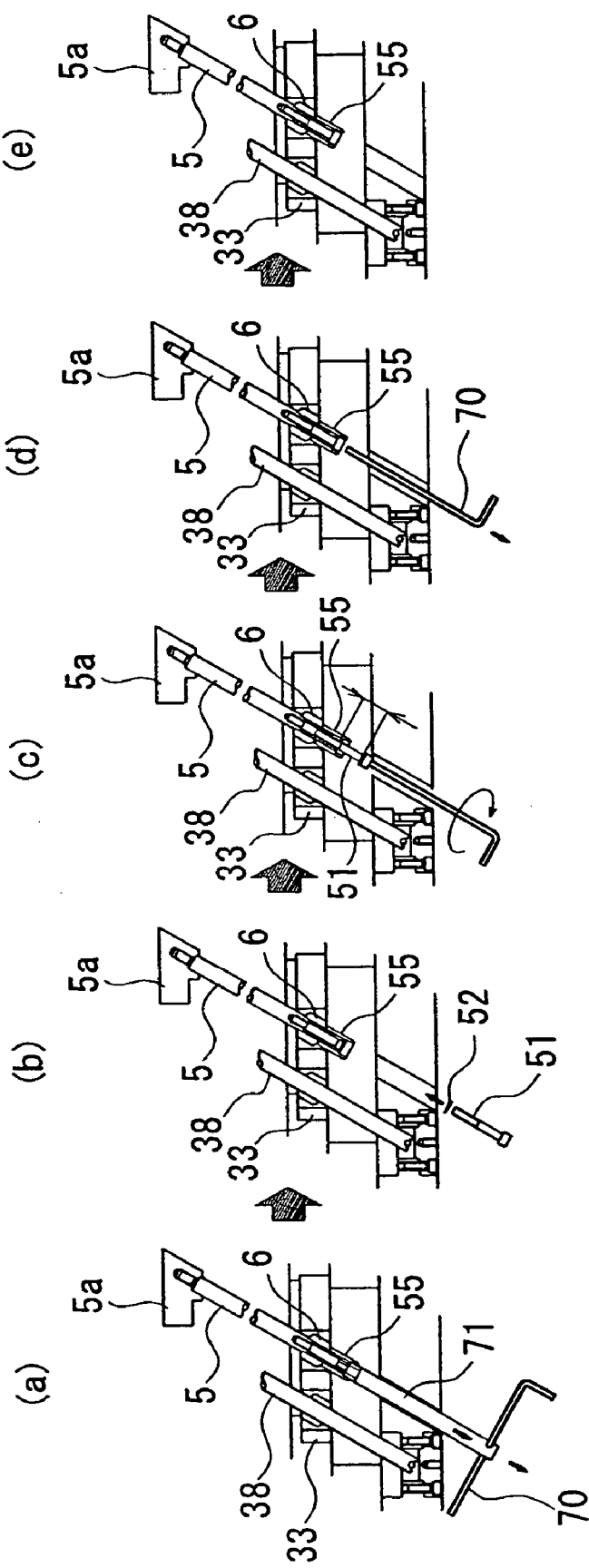
FIGS. 13A through 13E are diagrams illustrating assembly procedures for an adjustment coupling.

The adjusting screw 53 and the lower end portion 5d of the lift core 5 are fastened together by the cap bolt 51 after completion of fine adjustment of the axial length of the lift core 5 (See FIGS. 13B and 13C). When fastening with the cap bolt 51, the spacer collar 52 is inserted between the cap bolt 51 and the adjusting screw 53. This is done for the purpose of preventing the hexagonal hole of the adjusting screw 53 from being crushed.

The locknut 55 is formed as a hollow cylinder having a threaded portion 56a in an inner peripheral surface thereof. Further, the lock nut 55, which is formed as a hollow cylinder, has an inner hexagonal wrench hole 56 in the inner peripheral surface at one end thereof.

Next, the assembly procedures for the adjustment coupling 110 will be described with reference to FIGS. 9 through 14.

As shown in FIG. 9A, the lock nut 55 is threadedly engaged with an outer peripheral surface of the adjusting screw 53 beforehand. That is, the adjusting screw 53 is screwed into the lock nut 55 from one end thereof until the forward end of the adjusting screw 53 appears at the other end of the lock nut 55 (See FIG. 9B). While the lock nut 55 and the adjusting screw 53 provide a sufficient slackness restraining force with normal fastening, when a still firmer fastening is required, the forward screw thread of the adjusting screw 53 is previously saturated with several drops of locking agent.

As shown in FIG. 9D, when threadedly passing the adjusting screw 53 through the through-hole 6b of the shaft coupling 6, the forward end of a hexagonal wrench 70 is threadedly engaged with the inner hexagonal wrench hole 54 from below the ejector apparatus 100, thus threadedly engaging the adjusting screw 53 with the shaft coupling 6.

Next, as shown in FIG. 10A, the hexagonal wrench 70 is temporarily pulled out, and the lift core 5 is inserted into the shaft coupling 6.

The hexagonal wrench 70 is brought into a state in which it is inserted into a hollow hexagonal wrench (hexagonal sleeve wrench) 71 (Sec FIG. 10B), and the forward end portion of the hexagonal wrench 70 is engaged with the inner hexagonal wrench hole 54 of the adjusting screw 53. Next, the adjusting screw 53 is threadedly passed through the shaft coupling 6 again through turning with the hexagonal wrench 70 (See FIG. 10C).

Next, the apex portion of the lift core 5 is pressed axially downwards, and further, the adjusting screw 53 is threadedly passed through the shaft coupling 6 again through turning with the hexagonal wrench 70. Then, the lower end portion of the lift core 5 abuts the adjusting screw 53, and when the adjusting screw 53 is further advanced, a "stop" state can be observed in which the slide base 33 abuts the bottom surface of the slide path 2 the clearance of which has been set beforehand (See FIG. 10D).

As shown in FIG. 11A, while keeping the forward end of the hexagonal wrench 70 inserted into the inner hexagonal wrench hole 54, the adjusting screw 53 is fixed so that it may not turn with the locknut 55. Next, the forward end of the hexagonal sleeve wrench 71 is engaged with the inner hexagonal wrench hole 56 of the lock nut 55 and fastened manually. Through this manual fastening, the end surface of the shaft coupling 6 is engaged with the lock nut 55.

Next, through reversal and retraction of the adjusting screw 53 by an amount corresponding to an angle that can be known from the screw thread pitch of the adjusting screw 53 (See FIG. 11B), it is possible to perform fine adjustment of thermal expansion absorption for the axial length of the lift core 5. Thus, regarding the axial length of the lift core 5, its value is determined at the design stage, and fine adjustment thereof is performed by the above-mentioned angle to be known, whereby there is no need to perform gauging at the time of assembly.

Next, the forward end portion of the hexagonal wrench 70 is inserted into the inner hexagonal wrench hole 54, and, as shown in FIG. 12A, the adjusting screw 53 is fixed so as not to turn with the lock nut 55, and the forward end portion of the hexagonal sleeve wrench 71 is engaged with the inner hexagonal wrench hole 56 of the lock nut 55 to be fastened manually. Next, the hexagonal wrench 70 is drawn out (See FIG. 12B), and the hexagonal wrench 70 is passed through the side hole at the end of the hexagonal sleeve wrench 71 to turn the hexagonal sleeve wrench 71, and the adjusting screw 53 and the lock nut 55 are retightened, with the lock nut 55 being engaged with the end surface of the shaft coupling 6 (See FIG. 12C). In this way, the lock nut 55 serves as a so-called W-nut, functioning to effect locking for the adjusting screw 53. After the completion of the retightening, the hexagonal sleeve wrench 71 and the hexagonal wrench 70 are removed (See FIG. 13A).

Next, after the completion of the fine adjustment of the axial length of the lift core 5, the adjusting screw 53 and the lower end portion 5d of the lift core 5 are fastened together by the cap bolt 51 (See FIGS. 13B and 13C). When fastening them with the cap bolt 51, the spacer collar 52 is inserted between the cap bolt 51 and the adjusting screw 53. This is done for the purpose of preventing the hexagonal hole of the adjusting screw 53 from being crushed. After the fastening of the adjusting screw 53 and the lift core 5, the hexagonal wrench 70 is removed to complete the assembly of the adjustment coupling 110.

Next, the operation of the ejector apparatus 100 for the resin molding mold A of the first embodiment will be described.

After forming a molded piece by using the mold A, the ejector plate 1 is raised. When the ejector plate 1 is raised, a vertical raising force is applied to the lower end portion of the lift core 5 through the slide base 33 arranged in the slide path 32 of the upper and lower plates 1a and 1b.

However, in this slide base 33, the guide rod 38 is slidably passed through the guide bush 36 mounted to the base main body 34, so that, simultaneously with the rise of the slide base 33, it is forced to move horizontally along the guide rod 38. The inclination angle of this guide rod 38 is the same as that of the lift core 5.

As a result, the slide base 33 simultaneously receive upward and horizontal moving forces and is forced to move along the guide rod 38. Thus, a longitudinal moving force is imparted to the lift core 5 whose lower end portion 5d is firmly attached to the shaft coupling 6 of the slide base 33, and neither a bending force nor a moment that would generate friction is imparted to the angle setting hole 12 of the core 21b.

Conversely, when the ejector plate 1 descends, the slide base 33 is forced to move along the guide rod 38, whereby a longitudinal pull-down force is imparted to the lift core 5. As a result, also at the time of descent of the ejector plate 1, neither a bending force nor a moment for the lift core 5 is generated, so that it is possible to completely avoid friction with the angle setting hole 12.

According to the first embodiment, the rod of the lift core 5 produced based on the design value allows assembly setting within the adjustment range for the adjustment coupling 110 without having to perform machining for a reduction in length after assembly. Further, due to the guide rod (release guide) 38, there occurs no sliding of the slide base 33, thereby facilitating the assembly.

Further, according to the first embodiment, the rod of the lift core produced based on the design value allows assembly setting within the adjustment range of the adjustment coupling without having to perform machining for a reduction in length after assembly. Further, thermal expansion of the rod of the lift core can be absorbed.

Further, according to the first embodiment, the rod of the lift core produced based on the design value allows assembly setting within the adjustment range of the adjustment coupling without having to perform machining for a reduction in length after assembly. Further, due to the guide rod (release guide), there occurs no sliding of the slide base, thereby facilitating the assembly Furthermore, according the first embodiment, the setting of thermal expansion amount can be determined by the reversal amount of the adjusting screw.

Furthermore, according to the first embodiment, a minimum hole allows insertion of the hexagonal wrench and provides rotation space, making it possible to achieve space saving in terms of the area it occupies within the ejector apparatus itself. Further, a minimum hole allows insertion of the hollow wrench (hexagonal sleeve wrench) and provides rotation space, making it possible to achieve a reduction in the size of the ejector apparatus itself.

Further, in assembling the adjusting screw, the hexagonal wrench is always inserted into the hollow wrench (hexagonal sleeve wrench) for the lock nut for integral threaded insertion, thus allowing assembly of the two coaxial components (i.e., the adjusting screw and the lock nut).

Furthermore, in the ejector apparatus of the present invention, the adjusting screw and the lock nut are always fitted integrally, so that both have a hexagonal wrench hole structure, coaxially providing a wrench area of minimum rotation space. The hexagonal wrench for the adjusting screw allows fastening through insertion into the hollow hexagonal wrench with a round hole (hexagonal sleeve wrench) for the lock nut, thus needing no socket as in the case of an outer hexagonal screw nor rotation space for a spanner wrench.

Furthermore, according to the first embodiment, the adjusting screw is once brought into contact with the lower end portion of the lift core and is then reversed by an amount corresponding to an angle that can be known from the screw thread pitch, whereby it is possible to set the requisite clearance (absorption of thermal expansion coefficient) in the lift core length.

Note that, in the above-described first embodiment the adjustment coupling 110 is designed such that the lower end portion of the lift core 5 is supported on the base main body 34 so as to be pivotable in the inclining direction thereof so that the inclination angle of the guide rod 38 may be the same as that of the lift core 5. However, the present invention is not restricted to the construction in which the adjustment coupling 110 is supported so as to be pivotable in the inclining direction.

Figure 21:
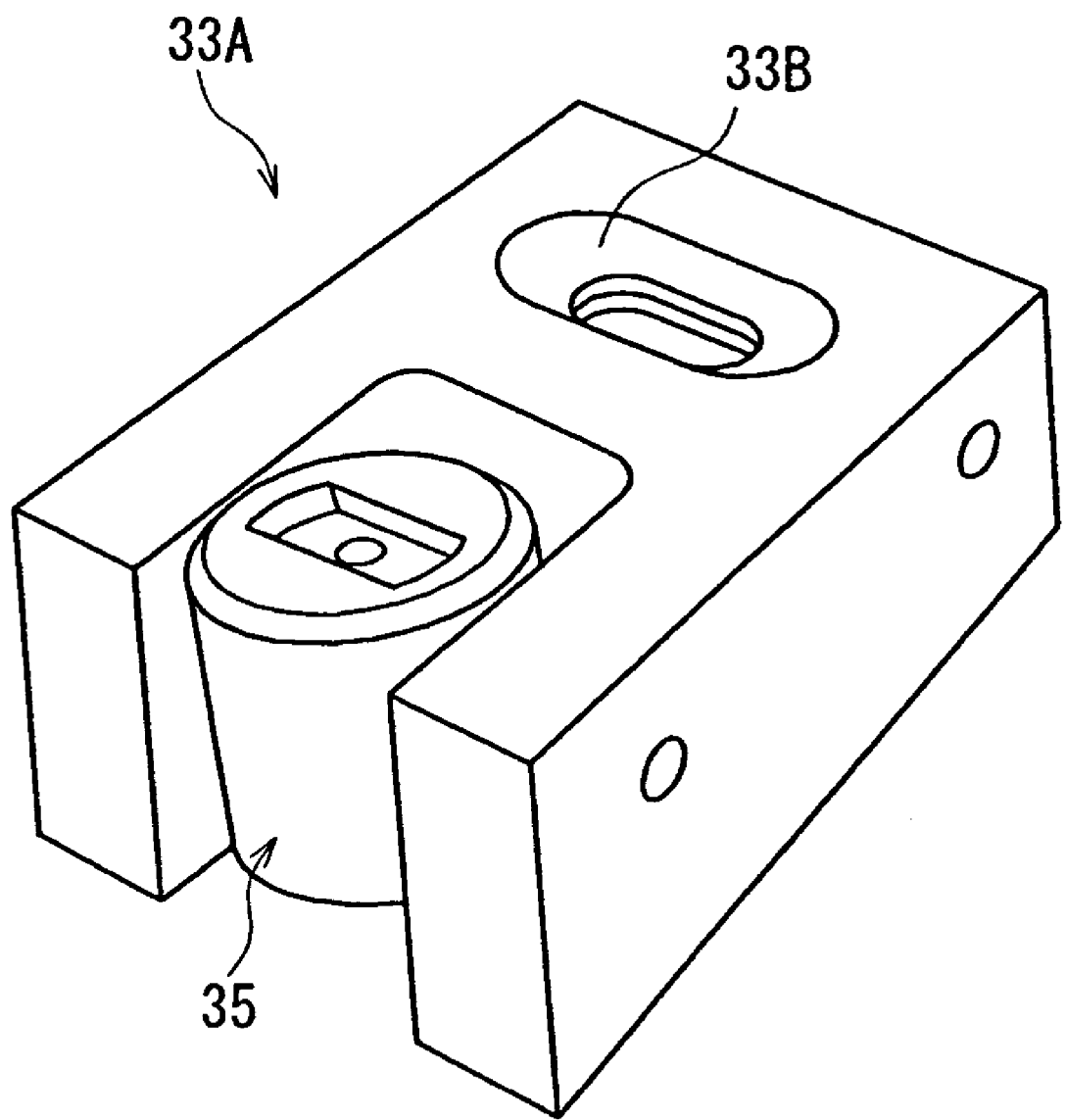
FIG. 21 is a perspective view of an adjustment coupling according to another embodiment of the present invention.

For example, the present invention also covers a structure as shown in FIG. 21, which shows a slide base 33A having a support member 33B that is not supported so as to be pivotable in the inclining direction of the lift core 5, the slide base simply having an insertion hole allowing insertion of the lower end portion of the lift core 5, with the insertion hole having a threaded portion.

SECOND EMBODIMENT

While in the above-described first embodiment the slide path allowing sliding of the slide base is provided in the ejector plate, and there is provided the guide rod that serves to force the slide base to slide horizontally, the present invention also covers a case where there is provided no slide path or guide rod.

Next, a second embodiment of the present invention, in which there is no slide path or guide rod, will be described with reference to FIGS. 15 through 20.

Unlike the first embodiment, the second embodiment adopts a construction in which a core rod standing vertically on an ejector plate (which corresponds to the lift core of the first embodiment) is caused to move up and down without using any guide rod or slide path (slide base). Therefore, here, a construction in which, unlike the first embodiment, the core rod is caused to move up and down by the ejector plate will be described in detail, and a description of any other construction will be omitted.

Figure 15:
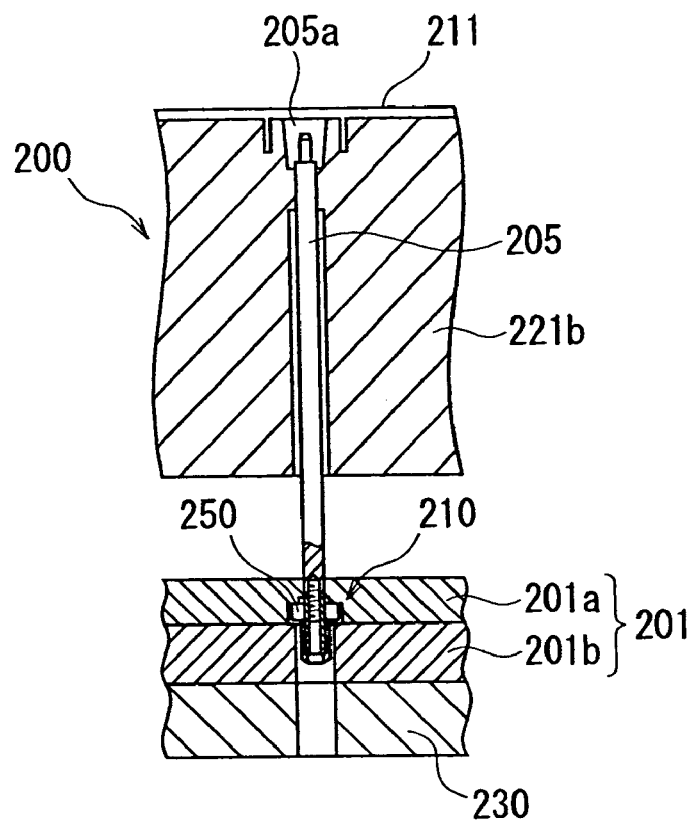
FIG. 15 is an explanatory view of an ejector apparatus according to a second embodiment of the present invention, showing an adjustment coupling when no slide base is used.

FIG. 15 shows an ejector apparatus 200 for a resin molding mold according to a second embodiment of the present invention.

As shown in FIG. 2, the general construction of a resin molding mold A equipped with this ejector apparatus 200 is as follows: a core 221b is arranged under a mold main body 221a, with the mold main body 21a and the core 221b defining a resin molding space 211 (FIG. 15).

In this resin molding mold A, there is provided a core rod 205 which is passed through the core 221b constituting the resin molding mold A to form a molded piece formed in the above-mentioned resin molding space 211 and which is longitudinally movable.

The upper end portion of this core rod 205 functions as a mold portion 205a which cooperates with the core 221b to form a molded piece. This core rod 205 is passed through a guide hole 221c formed in the core 221b, extending downwardly from the core 221b.

This core rod 205 is caused to slide vertically in an guide hole 221c of the core 221b by the ejector apparatus 200. The ejector apparatus 200 used for this purpose includes an ejector plate 201 composed of two plates 201a and 201b that are superimposed one upon the other. The lower end portion 205d of the core rod 205 is held between the plates 201a and 201b through the intermediation of a retainer collar 250. An adjustment coupling 210 according to the present invention is used in this joint portion.

Figure 16:
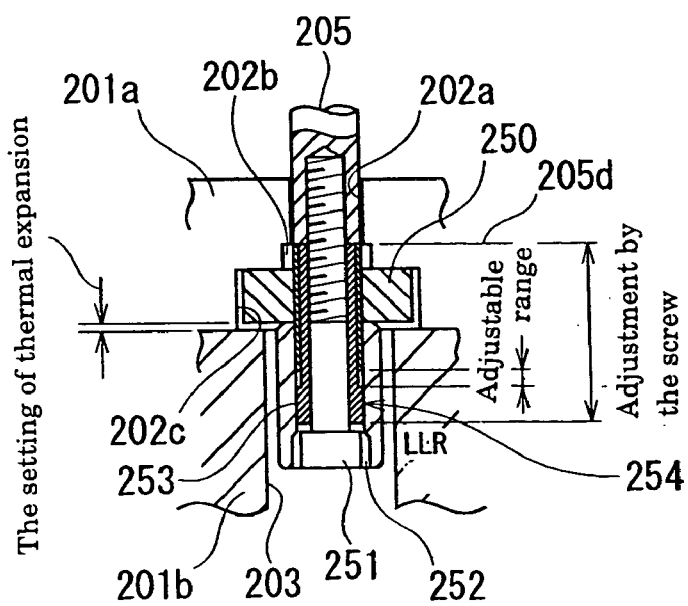
FIG. 16 is a longitudinal sectional view of an adjustment coupling according to the second embodiment.
Figure 17:
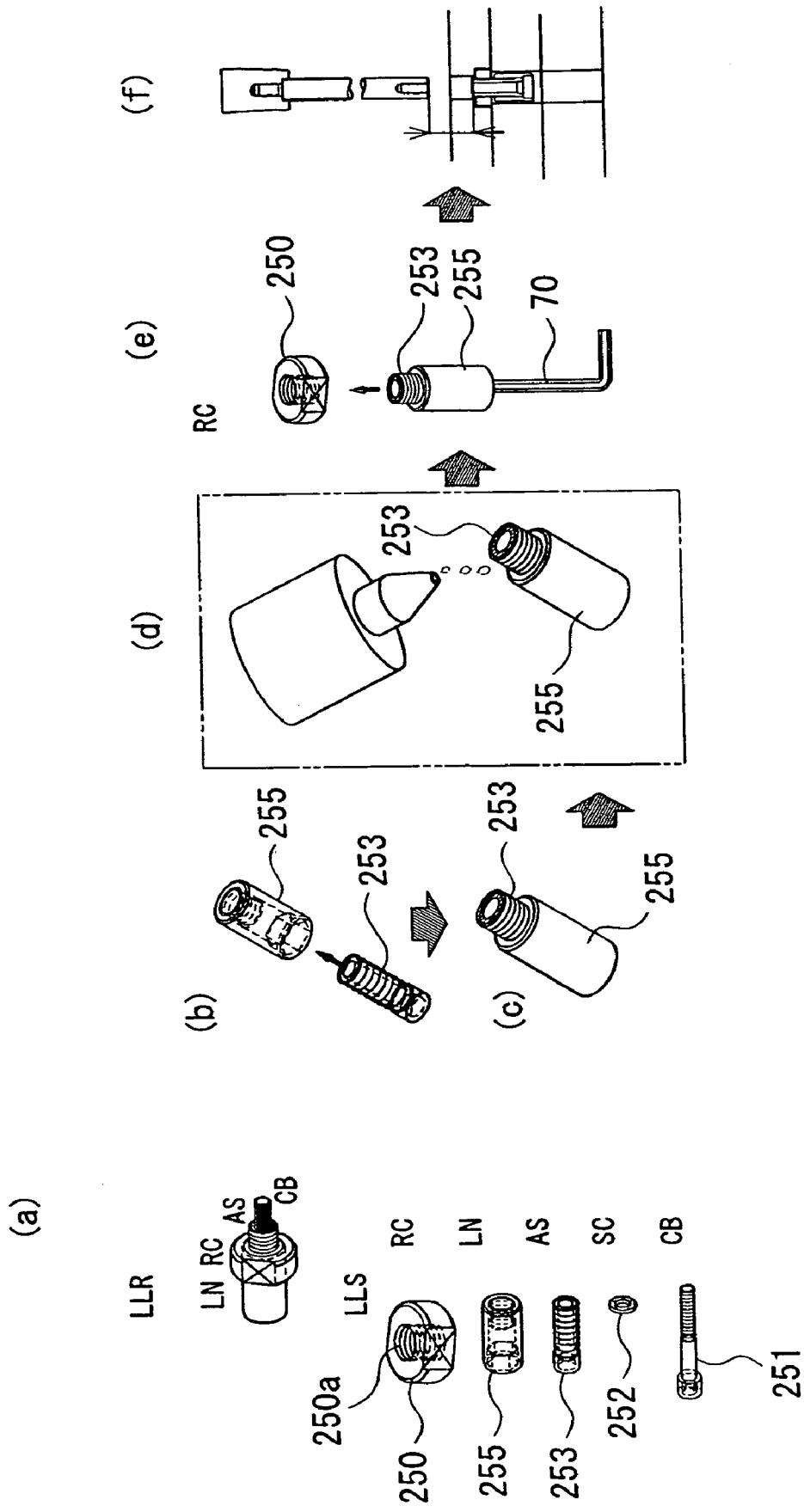
FIGS. 17A through 17F are diagrams illustrating assembly procedures for the adjustment coupling of the second embodiment.
Figure 18:
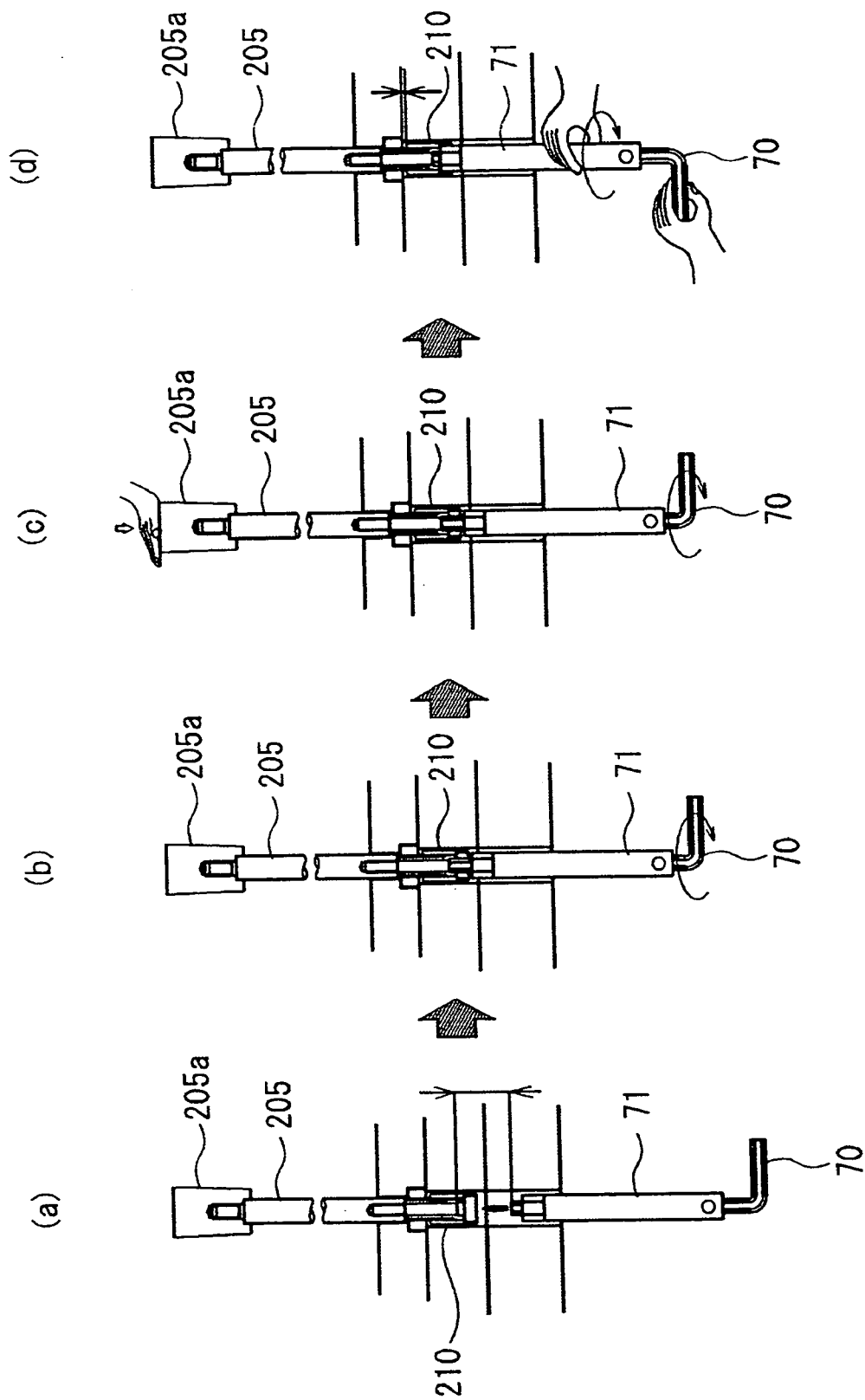
FIGS. 18A through 18D are diagrams illustrating assembly procedures for the adjustment coupling of the second embodiment.
Figure 19:
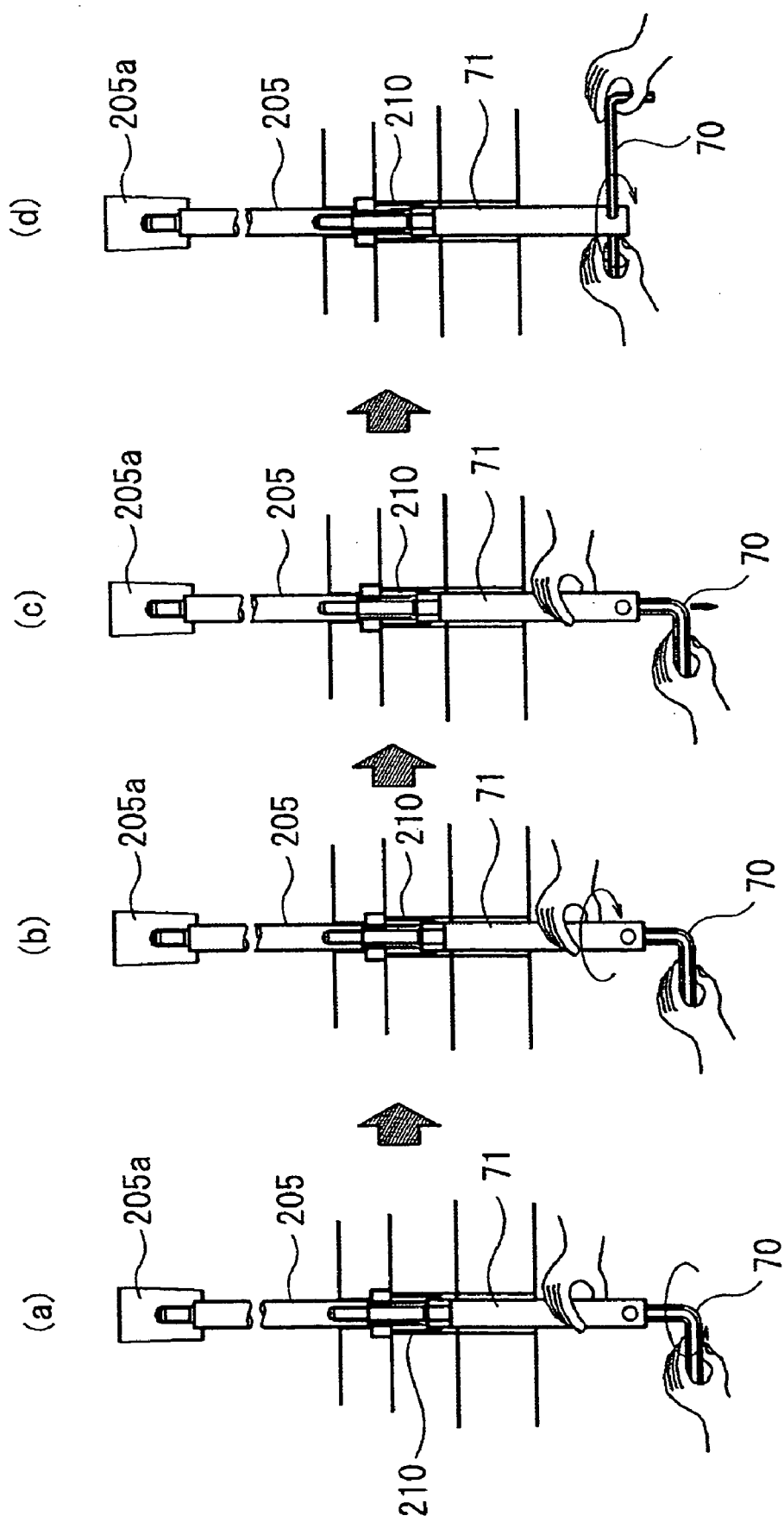
FIGS. 19A through 19D are diagrams illustrating assembly procedures for the adjustment coupling of the second embodiment.
Figure 20:
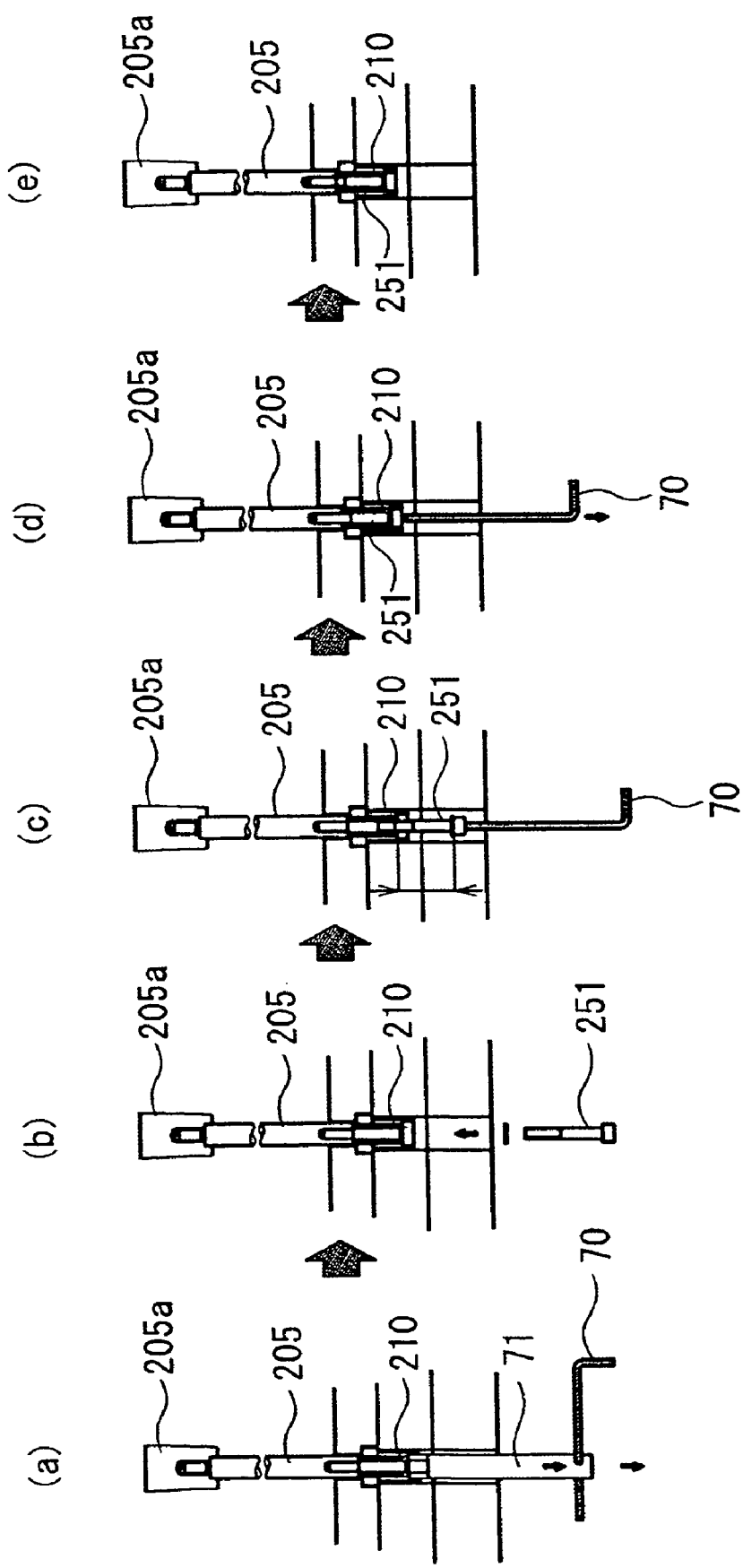
FIGS. 20A through 20E are diagrams illustrating assembly procedures for the adjustment coupling of the second embodiment.

As shown in FIG. 16, the upper plate 201a constituting the ejector plate 201 is equipped with a hole 202a for the core rod 205. Further, there are provided stepped holes 202b and 202c, which are coaxial with the hole 202a. Of the stepped holes 202b and 202c, the large diameter hole 202c is a hole into which the retainer collar 250 is to be inserted. The small diameter hole 202b serves as a clearance hole for an adjusting screw 253.

[Adjustment Coupling 210]

Next, an adjustment coupling 210 will be described with reference to FIGS. 16 to 20.

As shown in FIG. 16, the adjustment coupling 210 is composed of an adjusting screw 253 abutting the lower end portion 205d of the core rod 205, a bolt member (also referred to as cap bolt) 251 and a washer (spacer collar) 252 for fastening the adjusting screw 253 and the lower end portion 205d of the core rod 205 to each other, and a lock nut 255 to be threadedly engaged with the outer peripheral surface of the adjusting screw 253 until it abuts the other end portion of the retainer collar 250.

As shown in FIG. 17A, the retainer collar 250 is formed as a cylinder the side surface of which exhibits two flat faces formed by cutting. Due to this two-face cutting, the retainer collar 250 makes no axial rotation with in the large diameter hole 202c. Further, the retainer collar 250 is equipped with a through-hole in alignment with the center axis. A threaded portion 250a is formed in the inner peripheral surface of the through-hole.

The adjusting screw 253 is formed as a hollow cylinder having a threaded portion 253a on its outer peripheral surface. Further, the adjusting screw 253, which is formed as a hollow cylinder, has an inner hexagonal wrench hole 254 in the inner peripheral surface at one end thereof. The adjusting screw 253 is threadedly passed through the through-hole of the retainer collar 250 and abuts the lower end portion 205d of the core rod 205 (See FIG. 16).

The adjusting screw 253 and the lower end portion 205d of the core rod 205 are fastened together by the cap bolt 251 after completion of fine adjustment of the axial length of the core rod 205 (See FIGS. 20B and 20C). When fastening with the cap bolt 251, the spacer collar 252 is inserted between the cap bolt 251 and the adjusting screw 253.

The locknut 255 is formed as a hollow cylinder having a threaded portion 256a in the inner peripheral surface thereof. Further, the lock nut 255, which is formed as a hollow cylinder, has an inner hexagonal wrench hole 256 in the inner peripheral surface at one end thereof.

Next, the assembly procedures for the adjustment coupling 210 will be described with reference to FIGS. 17 through 20.

As shown in FIG. 17B, the lock nut 255 is threadedly engaged with the outer peripheral surface of the adjusting screw 253 beforehand. That is, the adjusting screw 253 is screwed into the locknut 255 from one end thereof until the forward end of the adjusting screw 253 appears at the other end of the lock nut 255 (See FIG. 17C). While the lock nut 255 and the adjusting screw 253 provide a sufficient slackness restraining force with normal fastening, when a still firmer fastening is required, the forward screw thread of the adjusting screw 253 is previously saturated with several drops of locking agent.

As shown in FIG. 17E, when threadedly passing the adjusting screw 253 through the through-hole of the retainer collar 250, the forward end of a hexagonal wrench 70 is threadedly engaged with the inner hexagonal wrench hole 254 from below the ejector apparatus 200, thus threadely engaging the adjusting screw 253 with the retainer collar 250.

Next, as shown in FIG. 17F, the hexagonal wrench 70 is temporarily pulled out, and the core rod 205 is inserted into the retainer collar 250.

The hexagonal wrench 70 is brought into a state in which it is inserted into a hollow hexagonal wrench (hexagonal sleeve wrench) 71 (See FIG. 18A), and the forward end portion of the hexagonal wrench 70 is engaged with the inner hexagonal wrench hole 254 of the adjusting screw 253. Next, the adjusting screw 253 is threadedly passed through the retainer collar 250 again through turning with the hexagonal wrench. 70 (See FIG. 18B).

Next, the apex portion of the core rod 205 is pressed axially downwards, and, further, the adjusting screw 253 is threadedly passed through the shaft coupling 6 again through turning with the hexagonal wrench 70. Then, the lower end portion of the core rod 205 abuts the adjusting screw 253, and, when the adjusting screw 253 is further advanced, a "stop" state is to be observed in which the retainer collar 250 abuts the bottom surface of the plate 201 the clearance of which has been set beforehand (See FIG. 18C).

As shown in FIG. 18D, while keeping the forward end of the hexagonal wrench 70 inserted into the inner hexagonal wrench hole 254, the adjusting screw 253 is fixed so that it may not turn with the lock nut 255. Next, the forward end of the hexagonal sleeve wrench 71 is engaged with the inner hexagonal wrench hole 56 of the lock nut 255 and fastened manually. Through this manual fastening, the end surface of the retainer collar 250 is engaged with the lock nut 255.

Figure 1:
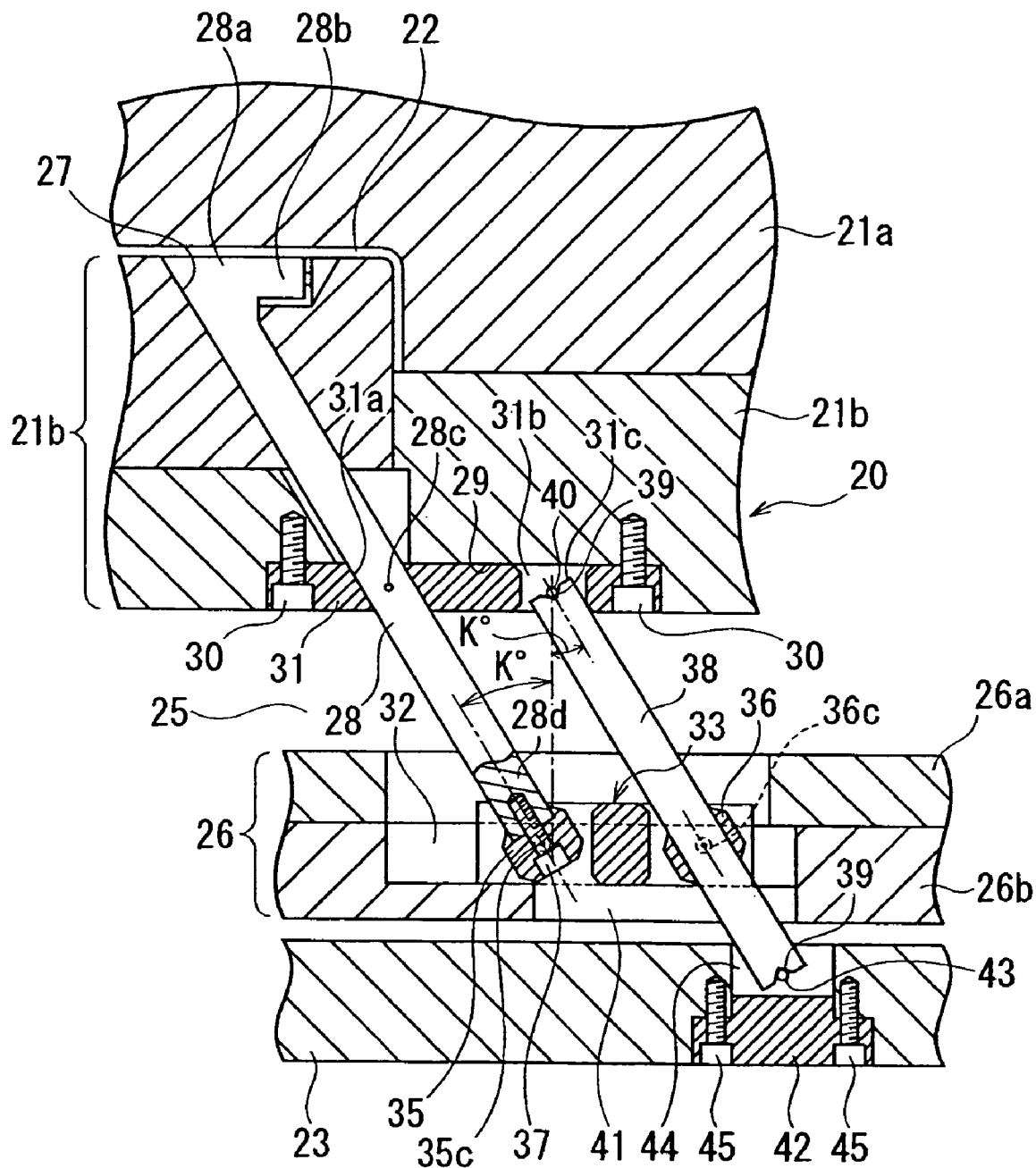
FIG. 1 is a sectional view of a conventional ejector apparatus for a resin molding mold.

Next, through reversal and retraction of the adjusting screw 253 by an amount corresponding to an angle that can be known from the screw thread pitch of the adjusting screw 253 (See FIG. 1C) it is possible to perform fine adjustment of thermal expansion absorption for the axial length of the core rod 205. Thus, regarding the axial length of the core rod 205, its value is determined at the design stage, and fine adjustment thereof is performed by the above-mentioned angle to be known, whereby there is no need to perform gauging at the time of assembly.

Next, the forward end portion of the hexagonal wrench 70 is inserted into the inner hexagonal wrench hole 54, and, as shown in FIG. 19B, the adjusting screw 253 is fixed so as not to turn with the lock nut 255, and the forward end portion of the hexagonal sleeve wrench 271 is engaged with the inner hexagonal wrench hole 256 of the lock nut 255 to be fastened manually. Next, the hexagonal wrench 70 is drawn out (See FIG. 19C), and the hexagonal wrench 70 is passed through the side hole at the end of the hexagonal sleeve wrench 71 to turn the hexagonal sleeve wrench 71, and the adjusting screw 53 and the lock nut 55 are retightened, with the lock nut 255 being engaged with the end surface of the retainer collar 250 (See FIG. 19D). In this way, the lock nut 55 serves as a so-called W-nut, functioning to effect locking for the adjusting screw 253. After the completion of the retightening, the hexagonal sleeve wrench 71 and the hexagonal wrench 70 are removed (See FIG. 20A).

Next, after the completion of the fine adjustment of the axial length of the core rod 205, the adjusting screw 253 and the lower end portion 205d of the core rod 205 are fastened together by the cap bolt 251 (See FIGS. 20B and 20C). When fastening them with the cap bolt 251, the spacer collar 252 is inserted between the cap bolt 251 and the adjusting screw 253. This is done for the purpose of preventing the hexagonal hole of the adjusting screw 253 from being crushed. After the fastening of the adjusting screw 253 and the core rod 205, the hexagonal wrench 70 is removed to complete the assembly of the adjustment coupling 210 (See FIGS. 20D and 20E)

What is claimed is:

1. An ejector apparatus for forming an undercut portion in a molded piece, comprising:
    a lift core extending through a core that constitutes a resin molding mold and installed so as to be movable in a longitudinal direction of the lift core with respect to a surface of the core;
    an ejector plate arranged between the core and a base plate so as to be capable of moving up and down, the base plate being arranged below the core while being spaced apart from the core; and
    an adjustment coupling that supports a lower end portion of the lift core and is supported so as to be capable of allowing for the length of the lift core to be increased or decreased in a longitudinal direction of the lift core among a variety of fixed positions with respect to the ejector plate.

2. An ejector apparatus according to claim 1, wherein the adjustment coupling is provided on an ejector plate side, the adjustment coupling comprising:
    a support member which has an insertion hole allowing insertion of the lower end portion of the lift core, the insertion hole having a threaded portion, the lower end portion of the lift core inserted from one end of the insertion hole being supported on the ejector plate side;
    an adjusting screw formed as a hollow cylinder having a threaded portion on its outer peripheral surface and adapted to be threadedly inserted from the other end of the insertion hole of the support member to abut the lower end portion of the lift core;
    a lock nut serving as a locking means; and
    a bolt member for fastening together the adjusting screw and the lower end portion of the lift core.

3. An ejector apparatus according to claim 2, wherein the adjusting screw and/or the lock nut has an inner hexagonal wrench hole.

4. An ejector apparats according to claim 2, wherein respective screws of the adjusting screw and the lock nut exhibit a screw fit length allowing locking without involving any stress relaxation due to fastening pre-tension.

5. An ejector apparatus according to claim 2, wherein adjusting screw and the lock nut each have a hexagonal wrench hole structure for a hollow hexagonal wrench with a round hole for fastening the lock nut and for a hexagonal wrench to be inserted into a hollow of the hollow hexagonal wrench with a round hole to fasten the adjusting screw, and
wherein the base plate and the ejector plate each have a space portion in which the hexagonal wrenches are turned around an axis of the hexagonal wrench hole structure.

6. An ejector apparatus according to claim 2, wherein the adjustment coupling is equipped wit a clearance setting portion that serves to set a predetermined clearance in an axial length of the lift core through reversal of the adjusting screw by an amount corresponding to an angle that can be known from a pitch of the screw portion after abutting the adjusting screw against the lower end portion of the lift core.

7. An ejector apparatus for forming an undercut portion in a molded piece, comprising:
a lift core extending through a core constituting a resin molding mold, the lift core being installed so as to be movable obliquely with respect to a surface of the core and in a longitudinal direction of the lift core;
an ejector plate arranged between the core and a base plate so as to be capable of moving up and down, the base plate being arranged below the core while being spaced apart from the core;
a slide path formed in the ejector plate so as to extend in a direction in which a lower end of the lift core makes relative horizontal movement at a time of ascent and descent of the lift core;
a slide base movably arranged in the slide path;
a guide bush supported on the slide base so as to be pivotable in an inclining direction of the lift core; and
a guide rod that serves to force the slide base to slide horizontally by sliding along the guide bush at a time of ascent and descent of the ejector plate,
wherein the slide base is equipped with:
a slide base main body; and
an adjustment coupling constructed such that a lower end portion of the lift core is supported so as to be capable of expanding and contracting in a longitudinal direction of the lift core with respect to the sliding base main body.

8. An ejector apparatus according to claim 7, wherein the adjustment coupling is provided on a slide base side, and is equipped with:
a support member which has an insertion hole allowing insertion of the lower end portion of the lift core, the insertion hole having a threaded portion, the lower end portion of the lift core inserted from one end of the insertion hole being supported on the slide base;
an adjusting screw formed as a hollow cylinder having a threaded portion on its outer peripheral surface and adapted to be threadedly inserted from the other end of the insertion hole of the support member to abut the lower end portion of the lift core;
a lock nut serving as a locking means; and
a bolt member for fastening together the adjusting screw and the lower end portion of the lift core.

9. An ejector apparatus according to claim 7, wherein the adjustment coupling is constructed such that the lower end portion of the lift core is supported so as to be pivotable in the inclining direction of the lift core with respect to the sliding base main body in such a way that an inclination angle of the guide rod is the same as an inclination angle of the lift core.

10. An ejector apparatus according to claim 9, wherein the adjustment coupling is provided on a slide base side, and is equipped with:
a support member which has an insertion hole allowing insertion of the lower end portion of the lift core, the insertion hole having a threaded portion, the lower end portion of the lift core inserted from one end of the insertion hole being supported on the slide base;
an adjusting screw formed as a hollow cylinder having a threaded portion on its outer peripheral surface and adapted to be threadedly inserted from the other end of the insertion hole of the support member to abut the lower end portion of the lift core;
a lock nut serving as a locking means; and
a bolt member for fastening together the adjusting screw and the lower end portion of the lift core.

11. An ejector apparatus for forming an undercut portion in a molded piece, comprising:
a lift core extending through a core constituting a resin molding mold, the lift core being installed so as to be movable obliquely with respect to a surface of the core and in a longitudinal direction of the lift core;
an ejector plate arranged between the core and a base plate so as to be capable of moving up and down, the base plate being arranged below the core while being spaced apart from die core;
a slide path fanned in the ejector plate so as to extend in a direction in which a lower end of the lift core makes relative horizontal movement at the time of ascent and descent of the lift core;
a slide base movably arranged in the slide path;
an adjustment coupling constructed such that a lower end portion of the lift core is supported so as to be capable of expanding and contracting in a longitudinal direction of the lift core and rotatable in an inclining direction of the lift core with respect to the sliding base main body;
a guide bush supported on the slide base so as to be pivotable in an inclining direction of the lift core; and
a guide rod that serves to force the slide base to slide horizontally by sliding along the guide bush at the time of ascent and descent of the ejector plate,
wherein the adjustment coupling is endowed with an alignment function by which an intersection point where the guide rod and the core cross each other, an intersection point where the guide rod and the guide bush cross each other, an intersection point where the lift core and the core cross each other, and an intersection point where the lift core and the adjustment coupling cross each other, are capable of fanning a parallelogram.

12. An ejector apparatus according to claim 11, wherein the adjustment coupling is provided on a slide base side, and is equipped with:
a support member which has an insertion hole allowing insertion of the lower end portion of the lift core, the insertion hole having a threaded portion, the lower end portion of the lift core inserted from one end of the insertion hole being supported on the slide base;
an adjusting screw formed as a hollow cylinder having a threaded portion on its outer peripheral surface and adapted to be threadedly inserted from the other end of the insertion hole of the support member to abut the lower end portion of the lift core;
a lock nut serving as a locking means; and
a bolt member for fastening together the adjusting screw and the lower end portion of the lift core.

13. An ejector apparatus according to claim 12, wherein respective screws of the adjusting screw and the lock nut exhibit a screw fit length allowing locking without involving any stress relaxation due to fastening pre-tension.

14. An ejector apparatus according to claim 12, wherein the adjusting screw and the lock nut each have a hexagonal wrench hole structure for a hollow hexagonal wrench with a round hole for fastening the lock nut and for a hexagonal wrench to be inserted into a hollow of the hollow hexagonal wrench with a round hole to fasten the adjusting screw, and
    wherein the base plate and the ejector plate each have a space portion in which the hexagonal wrenches are turned around an axis of the hexagonal wrench hole structure.

15. An ejector apparatus according to claim 12, wherein the adjustment coupling is equipped with a clearance setting portion that serves to set a predetermined clearance in an axial length of the lift core through reversal of the adjusting screw by an amount corresponding to an angle tat can be known from a pitch of the screw portion after abutting the adjusting screw against the lower end portion of the lift core.

16. An ejector apparatus according to claim 12, wherein the adjusting screw anti/or the lock nut has an inner hexagonal wrench hole.

17. An ejector apparatus according to claim 16, wherein the adjusting screw and the lock nut each have a hexagonal wrench hole structure for a hollow hexagonal wrench with a round hole for fastening the lock nut and for a hexagonal wrench to be inserted into a hollow of the hollow hexagonal wrench with a round hole to fasten the adjusting screw, and
    wherein the base plate and the ejector plate each have a space portion in which the hexagonal wrenches are turned around an axis of the hexagonal wrench hole structure.

18. An ejector apparatus according to claim 16, wherein the adjustment coupling is equipped with a clearance setting portion that serves to set a predetermined clearance in an axial length of the lift core through reversal of the adjusting screw by an amount corresponding to an angle that can be known from a pitch of the screw portion after abutting the adjusting screw against the lower end portion of the lift core.

19. An ejector apparatus according to claim 16, wherein respective screws of the adjusting screw and the lock nut exhibit a screw fit length allowing locking without involving any stress relaxation due to fastening pre-tension.

20. An ejector apparatus according to claim 19, wherein the adjusting screw anti the lock nut each have a hexagonal wrench hole structure for a hollow hexagonal wrench with a round hole for fastening the lock nut and for a hexagonal wrench to be inserted into a hollow of the hollow hexagonal wrench with a round hole to fasten the adjusting screw, and
    wherein the base plate and the ejector plate each have a space portion in which the hexagonal wrenches are turned around an axis of the hexagonal wrench hole structure.

21. An ejector apparatus according to claim 19, wherein the adjustment coupling is equipped with a clearance setting portion that serves to set a predetermined clearance in an axial length of the lift core through reversal of the adjusting screw by an amount corresponding to an angle that can be known from a pitch of the screw portion after abutting the adjusting screw against the lower end portion of the lift core.

\* \* \* \* \*

UNITED STATES PATENT AND TRADEMARK OFFICE
CERTIFICATE OF CORRECTION

PATENT NO. : 7,153,126 B2  
APPLICATION NO. : 10/673590  
DATED : December 26, 2006  
INVENTOR(S) : Hiroshi Takao Page 1 of 1

It is certified that error appears in the above-identified patent and that said Letters Patent is hereby corrected as shown below:

Column 17
  *Line 8*: please change "wit" to --with--

Column 18
  *Line 23*: please change "die" to --the--
  *Line 24*: please change "fanned" to --formed--
  *Line 46*: please change "fanning" to --forming--

Column 19
  *Line 15*: please change "tat" to --that--
  *Line 19*: please change "anti/or" to --and/or--

Column 20
  *Line 13*: please change "anti" to --and--

Signed and Sealed this

Tenth Day of April, 2007

JON W. DUDAS
*Director of the United States Patent and Trademark Office*